United States Patent
Liu et al.

(10) Patent No.: US 11,496,188 B2
(45) Date of Patent: Nov. 8, 2022

(54) ELECTRONIC DEVICE, COMMUNICATION METHOD AND MEDIUM

(71) Applicant: Sony Group Corporation, Tokyo (JP)

(72) Inventors: Wendong Liu, Beijing (CN); Zhaocheng Wang, Beijing (CN); Jianfei Cao, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/284,793

(22) PCT Filed: Oct. 21, 2019

(86) PCT No.: PCT/CN2019/112207
§ 371 (c)(1),
(2) Date: Apr. 13, 2021

(87) PCT Pub. No.: WO2020/083186
PCT Pub. Date: Apr. 30, 2020

(65) Prior Publication Data
US 2022/0006495 A1    Jan. 6, 2022

(30) Foreign Application Priority Data
Oct. 26, 2018   (CN) .......................... 201811256542.X

(51) Int. Cl.
*H04B 7/0452* (2017.01)
*H04B 7/0456* (2017.01)
*H04B 7/06* (2006.01)

(52) U.S. Cl.
CPC ......... *H04B 7/0452* (2013.01); *H04B 7/0469* (2013.01); *H04B 7/0478* (2013.01); *H04B 7/0639* (2013.01)

(58) Field of Classification Search
CPC .... H04B 7/046; H04B 7/0469; H04B 7/0478; H04B 7/0482; H04B 7/0452; H04B 7/0456; H04B 7/06; H04B 7/08
See application file for complete search history.

(56) References Cited

U.S. PATENT DOCUMENTS 9,209,874 B2 * 12/2015 Onodera .............. H04B 7/0456
2014/0079146 A1   3/2014 Kim
(Continued)

FOREIGN PATENT DOCUMENTS

CN    104221318 A   12/2014
CN    104811231 A    7/2015
(Continued)

OTHER PUBLICATIONS

International Search Report and Written Opinion dated Jan. 8, 2020, received for PCT Application PCT/CN2019/112207, Filed on Oct. 21, 2019, 8 pages including English Translation.

*Primary Examiner* — Betsy Deppe
(74) *Attorney, Agent, or Firm* — Xsensus LLP

(57) ABSTRACT

An electronic device operating on a base station side and includes a processing circuit configured to perform control to cause the electronic device to: estimate channel correlation in a first direction among a plurality of terminals communicating with the base station; and in response to that the estimated channel correlation in the first direction among the plurality of terminals satisfies a predetermined condition, transmit a first indication signal to indicate that a second measurement process is to be performed to determine channel information in a second direction after a first measurement process is to be performed to determine channel information in the first direction, and transmit, based on the channel information in the second direction, a second indication signal to indicate a precoding scheme for data to be
(Continued)

transmitted from the base station to the plurality of terminals, the precoding scheme including linear precoding or non-linear precoding.

20 Claims, 25 Drawing Sheets

(56) References Cited

U.S. PATENT DOCUMENTS

| | | |
|---|---|---|
| 2014/0269502 A1 | 9/2014 | Forenza |
| 2016/0065282 A1 | 3/2016 | Zhang et al. |
| 2019/0260459 A1 | 8/2019 | Jeon |
| 2020/0373987 A1* | 11/2020 | Noh ..................... H04B 7/0456 |

FOREIGN PATENT DOCUMENTS

| | | |
|---|---|---|
| CN | 105830355 A | 8/2016 |
| CN | 106941367 A | 7/2017 |
| WO | WO-2017118077 A1 | 7/2017 |
| WO | WO-2018074828 A1 | 4/2018 |

* cited by examiner

ELECTRONIC DEVICE, COMMUNICATION METHOD AND MEDIUM

CROSS-REFERENCE TO RELATED APPLICATIONS

The present application is based on PCT filing PCT/CN2019/112207, filed Oct. 21, 2019, which claims the benefit of Chinese Patent Application No. 201811256542.X, filed on Oct. 26, 2018, entitled "Electronic Device, Communication Method and Medium", each are hereby incorporated by reference in its entirety.

TECHNICAL FIELD

The present disclosure relates to electronic device, communication method and medium. More specifically, the present disclosure relates to electronic device, communication method and medium for hybrid precoding in Full-Dimension Multiple-Input Multiple-Output (FD-MIMO) systems.

BACKGROUND

Massive MIMO systems use precoding technology to achieve spatial multiplexing and improve spectrum efficiency. Known precoding techniques include Linear Precoding (LP) and Non-Linear Precoding (NLP). Traditional linear precoding includes Matched Filter (MF) precoding, Zero Forcing (ZF) precoding or Minimum Mean Square Error (MMSE) precoding. Traditional non-linear precoding includes Tomlinson-Harashima precoding (THP) or Vector Perturb (VP) or the like.

SUMMARY OF THE INVENTION

The inventors of the present disclosure find that although linear precoding can achieve better performance with lower complexity in weakly correlated channels, it is impossible to effectively eliminate inter-user interference and suppress noise in the meanwhile in strongly correlated channels. The inventors of the disclosure also find that although the traditional non-linear precoding can reduce inter-user interference, it has high computational complexity and requires accurate channel state information and there is a high reference signal overhead, when there are a large number of users and a large antenna scale on base station side.

FD-MIMO is a typical implementation of large-scale multi-antenna system. On one hand, its vertical angle of arrival is distributed in a small range, and the channel correlation is strong. On the other hand, it has a large number of users and a large scale of antenna on the base station side. Therefore, it is necessary to study the precoding scheme suitable for FD-MIMO to be used in next generation communication system such as 5G.

The present disclosure provides an electronic device operating on a base station side. The electronic device comprises a processing circuit configured to perform control to cause the electronic device to: estimate channel correlation in a first direction among a plurality of terminals communicating with the base station; and in response to that the estimated channel correlation in the first direction among the plurality of terminals satisfies a predetermined condition, transmit a first indication signal to indicate that a second measurement process is to be performed to determine channel information in a second direction after a first measurement process is to be performed to determine channel information in the first direction, and transmit, based on the channel information in the second direction, a second indication signal to indicate a precoding scheme for data to be transmitted from the base station to the plurality of terminals, the precoding scheme including linear precoding or non-linear precoding.

The present disclosure provides an electronic device operating on a terminal side. The electronic device comprises a processing circuit configured to perform control to cause the electronic device to: transmit a first reference signal to a base station for the base station to estimate channel correlation in the first direction between the terminal and other terminals; determine, in response to receiving a first indication signal, that a second measurement process is to be performed after a first measurement process is to be performed, wherein the electronic device performs a first measurement and feeds back the channel information in the first direction during the first measurement process, and the electronic device performs a second measurement and feeds back the channel information in the second direction during the second measurement process; and demodulate, in response to receiving a second indication signal, data transmitted from the base station according to a precoding scheme indicated in the second indication signal, the precoding scheme including linear precoding or non-linear precoding, wherein the first indication signal is transmitted by the base station in response to determining that the channel correlation in the first direction between the terminal and other terminals satisfies a predetermined condition, and the second indication signal is transmitted by the base station based on the channel information in the second direction fed back by the terminal.

The present disclosure provides an electronic device operating on a base station side. The electronic device comprises a processing circuit configured to perform control to cause the electronic device to: estimate channel correlation in a first direction among a plurality of terminals communicating with the base station; in response to that the estimated channel correlation in the first direction among the plurality of terminals satisfies a predetermined condition, determine, based on the respective channel information in the first direction fed back by the plurality of terminals, a common precoding parameter in the first direction for the plurality of terminals; determine, based on the respective channel information in the second direction fed back by the plurality of terminals, respective precoding parameters in the second direction for the plurality of terminals; and determine, based on the Kronecker product of the common precoding parameter in the first direction and the precoding parameters in the second direction, a precoding parameter for non-linear precoding of data to be transmitted from the base station to the plurality of terminals.

The present disclosure provides a communication method performed on a base station side, comprising: estimating channel correlation in a first direction among a plurality of terminals communicating with the base station; and in response to that the estimated channel correlation in the first direction among the plurality of terminals satisfies a predetermined condition, transmitting a first indication signal to indicate that a second measurement process is to be performed to determine channel information in a second direction after a first measurement process is to be performed to determine channel information in the first direction, and transmitting, based on the channel information in the second direction, a second indication signal to indicate a precoding scheme for data to be transmitted from the base station to the plurality of terminals, the precoding scheme including linear precoding or non-linear precoding.

The present disclosure provides a communication method performed on a terminal side, comprising: transmitting a first reference signal to a base station for the base station to estimate channel correlation in the first direction between the terminal and other terminals; determining, in response to receiving a first indication signal, that a second measurement process is to be performed after a first measurement process is to be performed, wherein a first measurement is performed and the channel information in the first direction is fed back during the first measurement process, and a second measurement is performed and the channel information in the second direction is fed back during the second measurement process, and demodulating, in response to receiving a second indication signal, data transmitted from the base station according to a precoding scheme indicated in the second indication signal, the precoding scheme including linear precoding or non-linear precoding, wherein the first indication signal is transmitted by the base station in response to determining that the channel correlation in the first direction between the terminal and other terminals satisfies a predetermined condition, and the second indication signal is transmitted by the base station based on the channel information in the second direction fed back by the terminal.

The present disclosure provides a communication method performed on a base station side, comprising: estimating channel correlation in a first direction among a plurality of terminals communicating with the base station; in response to that the estimated channel correlation in the first direction among the plurality of terminals satisfies a predetermined condition, determining, based on respective channel information in the first direction of the plurality of terminals, a common precoding parameter in the first direction for the plurality of terminals; determining, based on respective channel information in the second direction of the plurality of terminals, respective precoding parameters in the second direction for the plurality of terminals; and determining, based on the Kronecker product of the common precoding parameter in the first direction and the precoding parameters in the second direction, a precoding parameter for non-linear precoding of data to be transmitted from the base station to the plurality of terminals.

The present disclosure provides a non-transient computer-readable storage medium with instructions stored thereon which, when executed by a processor, cause the processor to execute the method of the present disclosure.

BRIEF DESCRIPTION OF THE DRAWINGS

A better understanding of the present disclosure may be obtained by referring to a detailed description given hereinafter in connection with accompanying figures, where the same or similar reference signs are used to indicate the same or similar components throughout the drawings. The drawings are included in the specification and form a part of the specification along with the following detailed description, for further illustrating embodiments of the present disclosure and for explaining the principles and advantages of the present disclosure.

DESCRIPTION OF EMBODIMENTS

Hereinafter, preferred embodiments of the present disclosure will be described in detail with reference to the appended drawings. Note that in this specification and the drawings, the same reference signs are used to represent structural elements with substantially the same functions and structures, and repetitive description of these structural elements is omitted.

Description will be made in the following order:
1. System Overview
2. Process flows
3. Simulation Results
4. Application Examples

1. SYSTEM OVERVIEW

Figure 1:
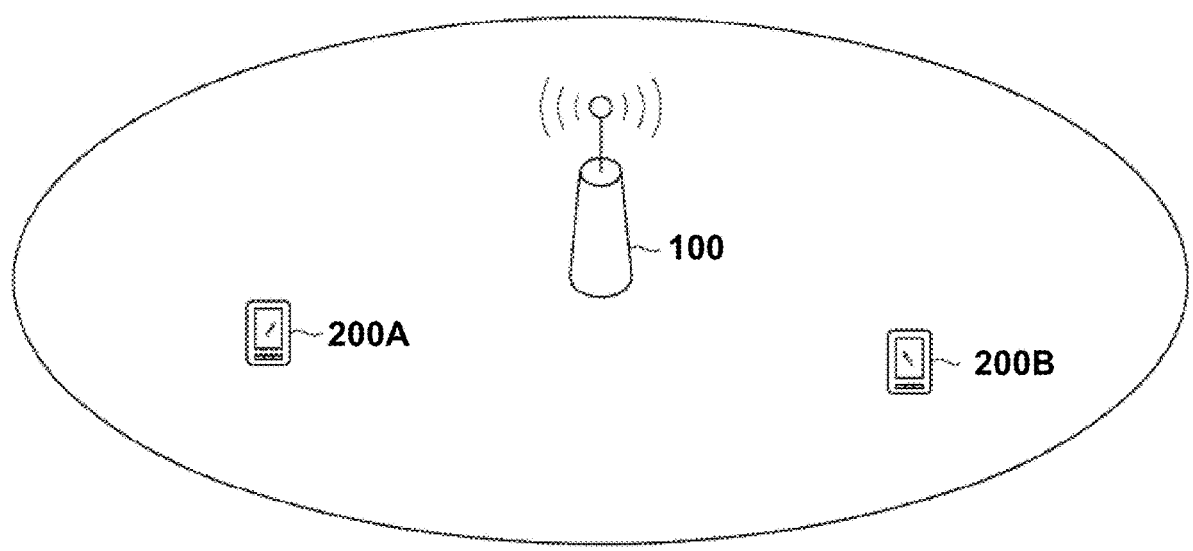
FIG. 1 is a schematic diagram showing a communication system according to some embodiments of the present disclosure.

First, a schematic structure of a communication system according to some embodiments of the present disclosure will be described with reference to FIG. 1. FIG. 1 is a schematic diagram showing a communication system according to some embodiments of the present disclosure. Referring to FIG. 1, the communication system includes a base station 100, and terminals 200A, 200B. The communication system performs kinds of communication such as LTE, LTE-Advanced, machine type communication (MTC), ad hoc network or cognitive radio (e.g., IEEE P802.19.1a and Spectrum Access System (SAS)).

The base station 100 communicates wirelessly with terminals 200A, 200B. The base station 100 also communicates with core network nodes (e.g., mobility management entity (MME), service gateway (S-GW), packet data network gateway (P-GW), etc.).

The terminals 200A, 200B communicate wirelessly with the base station 100. Terminals 200A, 200B also communicate with other devices (e.g., core network nodes and external devices) through the base station 100. In addition, the terminals 200A, 200B may also perform, for example, a machine type communication (MTC).

The base station 100 can communicate with terminals 200A, 200B using the same time-frequency resources to realize spatial multiplexing. For example, in the case of a multi-user MIMO, the base station 100 communicates with a plurality of terminals (users) on the same time-frequency resources using MIMO antennas.

There may be a spatial correlation between multiple terminals communicating with the base station using the same time-frequency resources. The base station 100 can reduce the spatial correlation between terminals 200A, 200B by precoding technology, thereby reducing the mutual interference between terminals 200A, 200B.

Note that although two terminals 200A, 200B are shown in FIG. 1, the communication system 100 may actually include more terminals. In the following description, when it is not necessary to distinguish between terminals 200A, 200B, the terminals 200A, 200B are uniformly represented by the sign 200.

Figure 2:
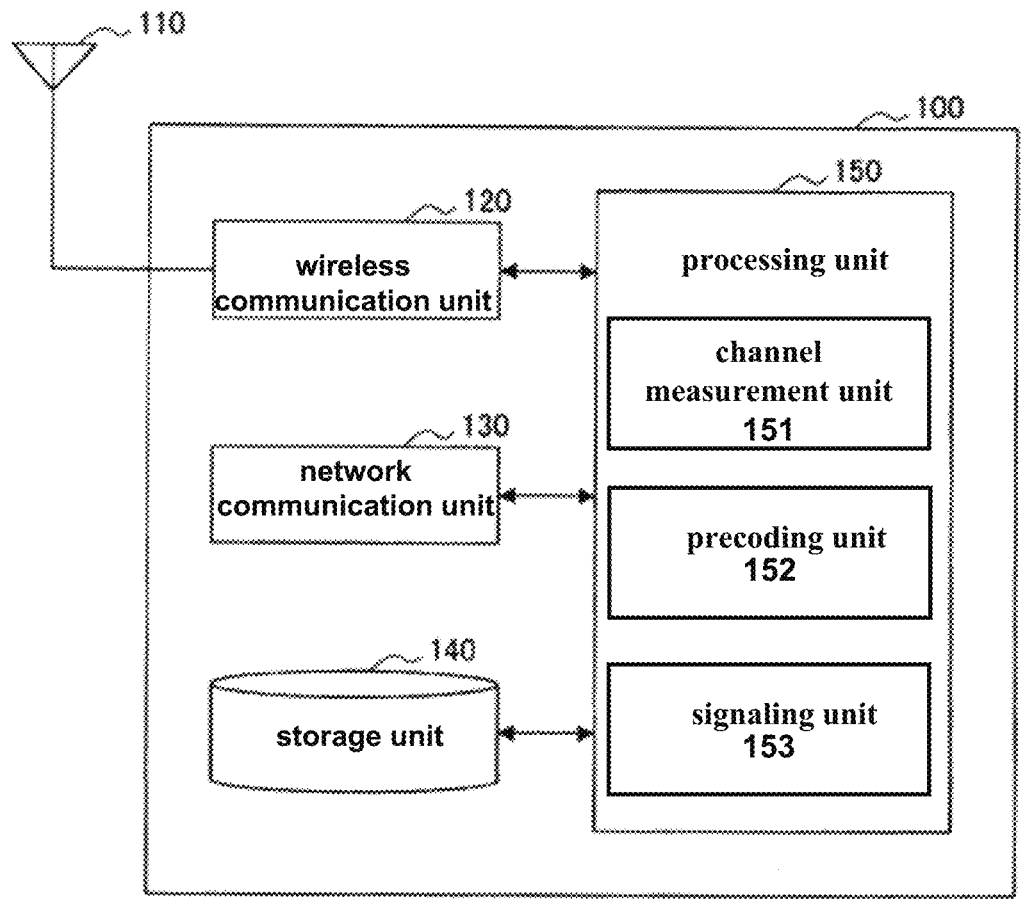
FIG. 2 is a schematic diagram showing the structure of a base station according to some embodiments of the present disclosure.

Next an example of the structure of the base station 100 according to some embodiments of the present disclosure will be described with reference to FIG. 2. FIG. 2 is a schematic diagram showing the structure of the base station 100 according to some embodiments of the present disclosure. Referring to FIG. 2 the base station 100 includes an antenna unit 110, a wireless communication unit 120, a network communication unit 130, a storage unit 140 and a processing unit 150.

The antenna unit 110 receives the radio signal and outputs the received radio signal to the wireless communication unit 120. The antenna unit 110 also transmits a transmitting signal output from the wireless communication unit 120. The antenna unit 110 may include a plurality of antennas. In some embodiments of the present disclosure, the plurality of antennas transmit precoded data signals to terminals 200A, 200B on the same transmission resources (e.g. time-frequency resources).

The wireless communication unit 120 communicates wirelessly with terminals 200A, 200B. The network communication unit 130 communicates with other communication nodes. For example, the network communication unit 130 communicates with other base stations 100. In addition, the network communication unit 130 communicates with the core network node, for example. The storage unit 140 stores programs and data for operating the base station 100.

The processing unit 150 provides various functions of the base station 100. In some embodiments of the present disclosure the processing unit 150 includes a channel measurement unit 151, a precoding unit 152 and a signaling unit 153. The channel measurement unit 151 performs a channel measurement function, the precoding unit 152 controls a precoding operation, and the signaling unit 153 performs a signaling interaction function. The channel measurement unit 151, the precoding unit 152 and the signaling unit 153 may be hardware circuits or software modules.

In some embodiments of the present disclosure, the base station 100 also includes a digital precoder, and the base station 100 is configured to perform baseband digital precoding on the transmitting signal. The digital precoder is configured to adjust amplitude and phase of a baseband data signal for each terminal according to a selected precoding scheme.

Figure 3:
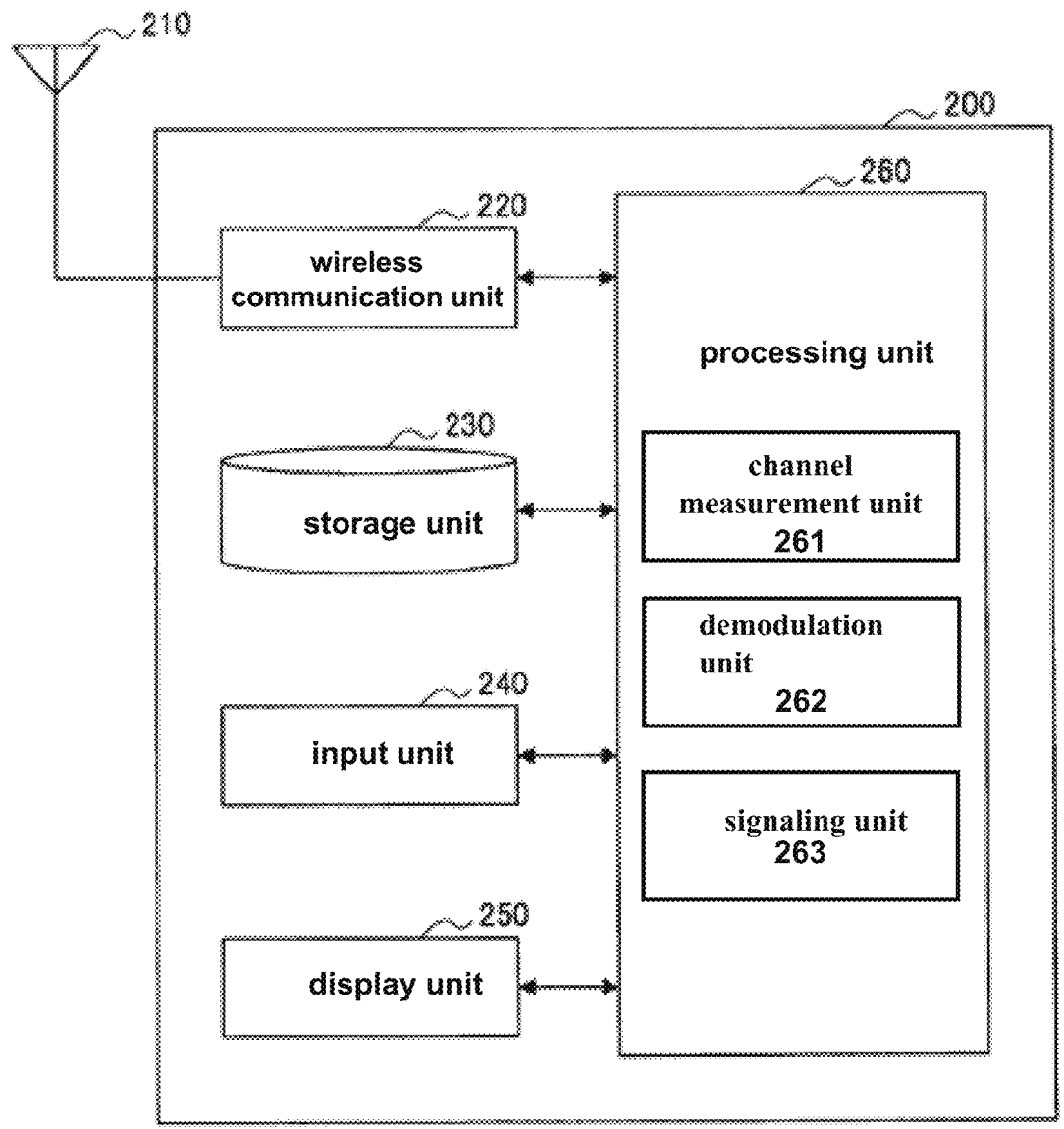
FIG. 3 is a schematic diagram showing the structure of a terminal according to some embodiments of the present disclosure.

Next an example of the structure of the terminal 200 according to some embodiments of the present disclosure will be described with reference to FIG. 3. FIG. 3 is a schematic diagram showing the structure of the terminal 200 according to some embodiments of the present disclosure. Referring to FIG. 3 the terminal 200 includes an antenna unit 210, a wireless communication unit 220, a storage unit 230, an input unit 240, a display unit 250 and a processing unit 260.

The antenna unit 210 receives a radio signal and outputs the received radio signal to the wireless communication unit 220. In some embodiments of the present disclosure the antenna unit 210 may receive a precoded signal transmitted by the base station 100 to the terminals 200A, 200B on the same transmission resources.

The antenna unit 210 also transmits a transmitting signal output from the wireless communication unit 220. The wireless communication unit 220 communicates wirelessly with the base station 100. The storage unit 230 stores programs and data for operating the terminal 200. The input unit 240 receives input performed by a user of the terminal 200. Then the input unit 240 provides results of the input to the processing unit 260. The display unit 250 displays an output screen (i.e. an output image) from the terminal 200. For example, the display unit 250 displays the output screen under the control of the processing unit 260.

The processing unit 260 provides various functions of the terminal 200. The processing unit 260 includes a channel measurement unit 261, a demodulation unit 262 and a signaling unit 263. The channel measurement unit 261 performs a channel measurement function. The demodulation unit 262 controls a demodulation operation. The signaling unit 263 performs a signaling interaction function.

The channel measurement unit 261, the demodulation unit 262 and the signaling unit 263 may be hardware circuits or software modules.

One or more functions of the base station 100 or the terminal 200 may be realized by a processing circuit. The processing circuit may be configured to directly perform or control other components of the base station 100 or terminal 200 and/or external components to perform the functions of the base station 100 or terminal 200. In some embodiments according to the present disclosure, the processing circuit is in the form of a general-purpose processor or a dedicated processing circuit such as an ASIC. In some embodiments, the processing circuit is able to be constructed by a circuit (hardware) or a central processing device (such as a central processing unit (CPU)).

Part or all of the processing circuit may be arranged in an electronic device within the base station 100 or terminal 200. Part or all of the processing circuit may be arranged in an electronic device external to the base station 100, which may be arranged remotely to the base station 100. For example a portion of the processing circuit may be implemented as a remote control terminal or a component of the remote control terminal of the base station 100.

The electronic device may be configured as a chip (such as an integrated circuit module including a single chip), a hardware component, or a complete product. The electronic device may be configured to include one or more other components of the base station 100 or the terminal 200. For example, the electronic device may be configured to include one or more antennas. In some embodiments the electronic device may be configured as the base station 100 or the terminal 200 itself.

2. PROCESS FLOWS

Next the process flows of the communication system according to some embodiments of the present disclosure will be described with reference to FIGS. 4-12. The base station and the terminal may communicate according to a FDD communication mechanism or a TDD communication mechanism. One of the differences between the FDD communication mechanism and the TDD communication mechanism is whether uplink and downlink channel reciprocity can be used in the process of channel estimation. Under the TDD communication mechanism, the uplink channel and the downlink channel use the same frequency band, so they are reciprocal. Under the FDD communication mechanism, the uplink channel and the downlink channel use different frequency bands, so they are not reciprocal. The following content will mainly describe the process flows under the FDD communication mechanism. However, some embodiments of the present disclosure can be used not only for the TDD communication mechanism, but also for the FDD communication mechanism. In addition, some variant examples under the FDD communication mechanism are also described in the following description.

Figure 4:
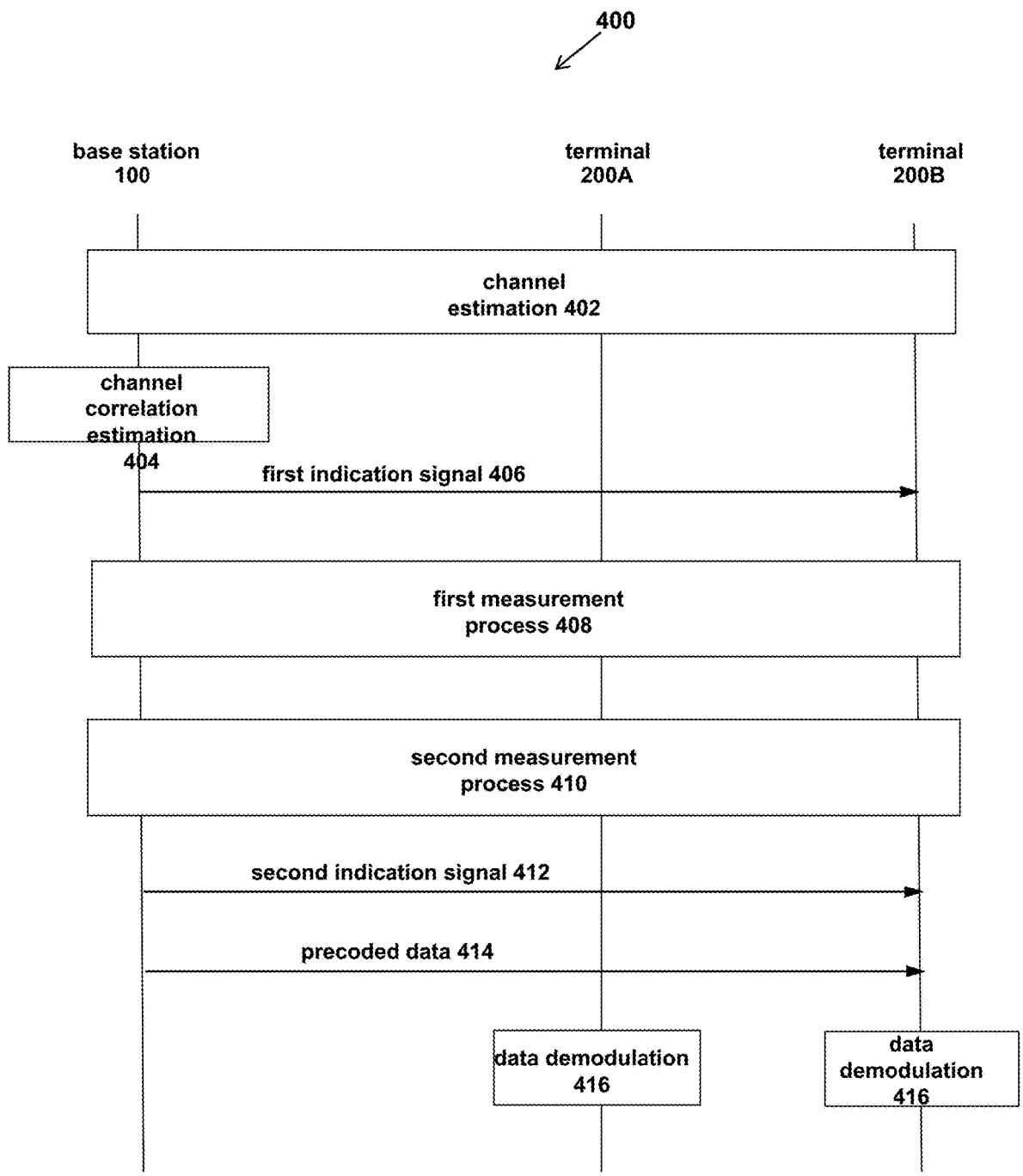
FIG. 4 is a schematic diagram showing a process flow of a communication system according to some embodiments of the present disclosure.

FIG. 4 is a schematic diagram showing a process flow 400 of a communication system according to some embodiments of the present disclosure.

In step 402, the base station 100 and terminals 200A, 200B perform a channel estimation process to estimate the channels between the base station 100 and the terminals 200A, 200B. In step 404, the base station 100 estimates the channel correlation (preferably, the correlation of the downlink channels) of the terminals 200A, 200B based on the estimated channels.

In some embodiments of the present disclosure, terminals 200A, 200B transmit first reference signals to the base station 100. The base station 100 estimates the channel correlation between the terminals 200A, 200B based on the first reference signals received from the terminals 200A, 200B. For example, the base station 100 estimates the uplink channels of the terminals 200A, 200B based on the received first reference signals, and then estimates the channel correlation between the terminals 200A, 200B based on the estimated uplink channels.

Under the TDD communication mechanism, the uplink channel and the downlink channel are reciprocal. Therefore, the downlink channel correlation between the terminals 200A, 200B may be estimated by the base station 100 based on the first reference signals received from the terminals 200A, 200B.

Under the FDD communication mechanism, the uplink channel and the downlink channel are not reciprocal. However, the inventors of the present disclosure find that although the uplink channel and the downlink channel do not have reciprocity and cannot obtain accurate downlink channel information according to the uplink channel, the spatial correlation of the uplink channels between the two terminals is consistent with the spatial correlation of the downlink channels between them. Therefore, the inventor of the present disclosure proposes that the technical scheme disclosed herein can also use the first reference signals received from the terminals 200A, 200B to estimate the downlink channel correlation between the terminals 200A, 200B under the FDD communication mechanism.

In some embodiments of the present disclosure, the base station 100 transmits a first reference signal to the terminals 200A, 200B. The terminals 200A, 200B estimate the downlink channels based on the first reference signal received from the base station 100 and feed back the estimated downlink channels to the base station 100. The base station 100 then estimates the downlink channel correlation between the terminals 200A, 200B based on the downlink channels fed back from the terminals 200A, 200B. In addition, the base station 100 may determine the channel correlation between the terminals 200A, 200B based on quality of signals received from the terminals 200A, 200B. For example, in some scenarios, the channel correlation of terminals 200A, 200B is considered to be higher when the quality of signals received from terminals 200A, 200B is lower, and the channel correlation of terminals 200A, 200B is considered to be lower when the quality of signals received from terminals 200A, 200B is higher.

In some embodiments of the present disclosure, the base station 100 determines the channel correlation by evaluating the singularity of the channel matrix. For example, the condition number of channel H can be calculated cond(H) $=\|H\|\cdot\|H^{-1}\|$ (different norm calculation methods can be used to calculate the matrix norm). The larger the cond(H) is, the closer the channel matrix is to singularity or non-full rank, and the higher the channel correlation is.

In the embodiments of the present disclosure, the uplink/downlink channel is divided into two directions in three-dimensional space (e.g., a first direction and a second direction) to seek a precoding scheme with a tradeoff between performance, complexity and signaling overhead. The base station 100, for example, uses antennas in the first direction to receive uplink reference signals transmitted by the terminals 200A, 200B to estimate the channel correlation between the terminals 200A, 200B in the first direction. The base station 100 determines whether the channel correlation in the first direction satisfies a predetermined condition, and if the predetermined condition is satisfied, it is determined that the channel correlation in the first direction is high enough. Specifically, the condition number of the channel $H_e$ in the first direction can be calculated as $cond(H_e)=\|H_e\|\cdot\|H_e^{-1}\|$ (different norm calculation methods can be used to calculate the matrix norm). The larger the $cond(H_e)$ is, the closer the channel matrix is to singularity or non-full rank, so that the higher the channel correlation in the first direction is. In some embodiments of the present disclosure, the predetermined condition includes that the channel correlation in the first direction is higher than a first correlation threshold. In some embodiments of the present disclosure, the base station 100 also uses, for example, antennas in the second direction to receive uplink reference signals transmitted by the terminals 200A, 200B to estimate the channel correlation between the terminals 200A, 200B in the second direction, and the predetermined condition includes that the channel correlation in the first direction is higher than the channel correlation in the second direction.

In common use scenarios, multiple terminals are distributed within a larger angle in the horizontal direction and within a smaller angle in the vertical direction. Therefore, the channel correlation in the vertical direction among the plurality of terminals is usually significantly greater than the channel correlation in the horizontal direction. Therefore, for this use scenario, only the channel correlation in the vertical direction may be estimated. At this point, the first direction is vertical and the second direction is horizontal.

However, the embodiments of the present disclosure are not limited to such use scenarios, but can also be used in scenarios where the channel correlation in the horizontal direction is greater than the channel correlation in the vertical direction, for example, in scenarios where end users on different floors of a building request services at the same time, or in scenarios where it cannot be determined in advance the channel correlation in which direction is stronger. Therefore, in the following discussion, we use the first direction and the second direction to refer to the two directions that are orthogonal to each other, rather than limiting them to the vertical or horizontal direction.

In addition, the first direction and the second direction are not limited to the vertical direction and the horizontal direction, but can also refer to other directions that are perpendicular to each other.

In step 406, the base station 100 may transmit, if determining the channel correlation in the first direction satisfies the predetermined condition, a first indication signal to indicate that a second measurement process is to be performed to determine the channel information in the second direction after the first measurement process is to be performed to determine the channel information in the first direction. In response to receiving the first indication signal, the terminals 200A, 200B determine that the second measurement process is to be performed after the first measurement process is to be performed. The terminals 200A, 200B perform the first measurement and feed back the channel information in the first direction during the first measurement process. The terminals 200A, 200B perform the second measurement and feed back the channel information in the second direction during the second measurement process.

The first indication signal may, for example, be one bit in control signaling (e.g., RRC signaling). The execution order of the first measurement process and the second measurement process can be indicated by assigning different values to the first indication signal so that the terminal can select a corresponding codebook for measurement result feedback. For example, the first indication signal may be set to 0 to indicate that the first measurement process is performed first and then the second measurement process, and the first indication signal is set to 1 to indicate that the second measurement process is performed first and then the first measurement process, and vice versa. In some embodiments of the present disclosure, more bits may be allocated to the first indication signal so that the first indication signal can carry more information.

In step 408, the base station 100, and terminals 200A, 200B perform a first measurement process to determine channel information in the first direction. In step 410, the base station 100 and terminals 200A, 200B perform a second measurement process to determine channel information in the second direction. The first measurement process and the second measurement process will then be described with reference to FIG. 5-6.

Figure 5A:
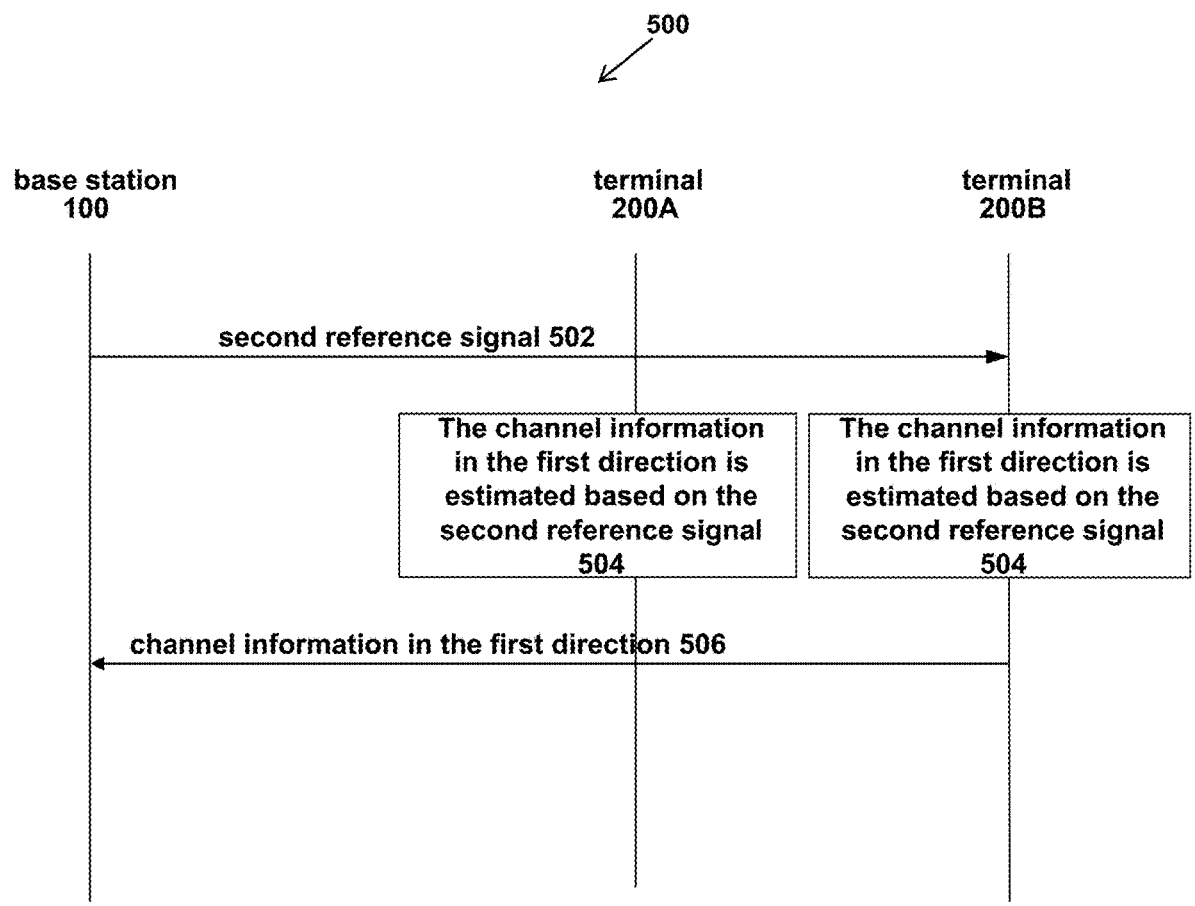
FIG. 5A is a schematic diagram showing a first measurement process of a communication system according to some embodiments of the present disclosure.

FIG. 5A is a schematic diagram showing a first measurement process 600 of a communication system according to some embodiments of the present disclosure.

Figure 5B:
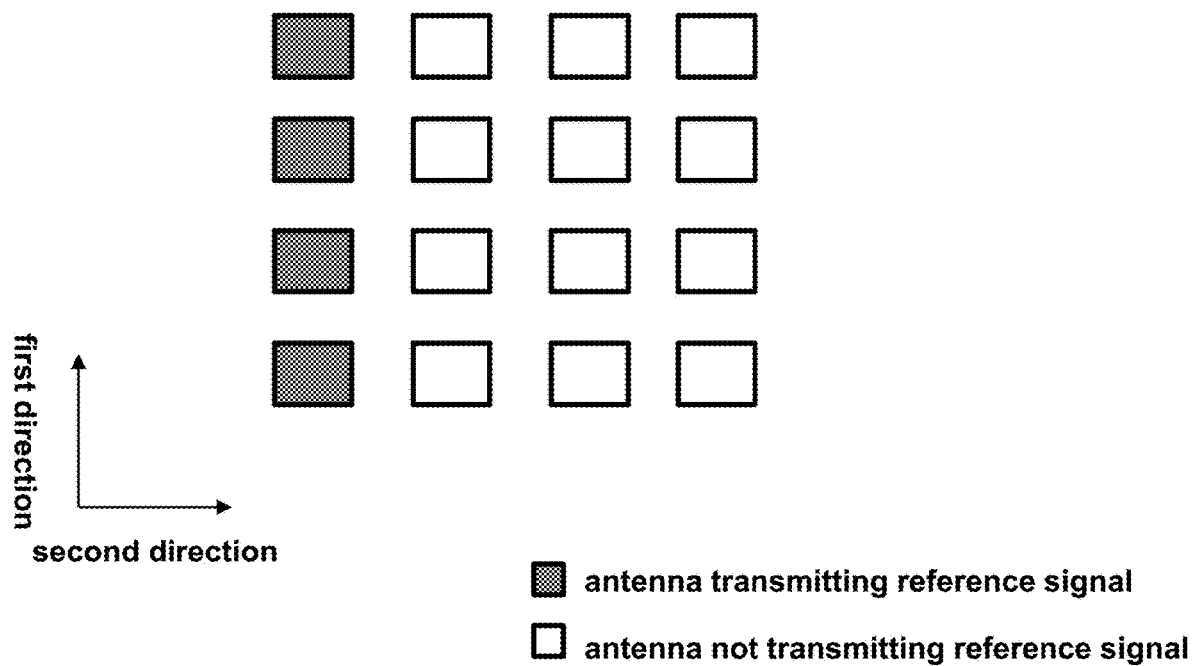
FIG. 5B is a schematic diagram showing the transmission of a second reference signal in the first direction through antennas according to some embodiments of the present disclosure.

In step 502, the base station 100 transmits a second reference signal in the first direction to the terminals 200A, 200B. The terminals 200A, 200B receive a second reference signal transmitted by the base station 100 in the first direction to perform the first measurement. FIG. 5B is a schematic diagram showing the transmission of a second reference signal in the first direction through antennas according to some embodiments of the present disclosure. As shown in FIG. 5B, the base station 100 selects a column of antennas in the first direction and transmits a second reference signal through the selected column of antennas. Note that although 4×4 antennas are shown in FIG. 5B, the base station 100 may also use antennas of other scales.

In step 504, terminals 200A, 200B estimate the channel information in the first direction based on the second reference signal. For example, terminals 200A, 200B may select a precoding matrix that matches the result of the first measurement from the channel codebook in the first direction. In step 506, the terminals 200A, 200B feed back the channel information in the first direction to the base station 100. For example, the terminals 200A, 200B include an indicator of the matched precoding matrix in the channel information in the first direction as fed back.

Figure 6A:
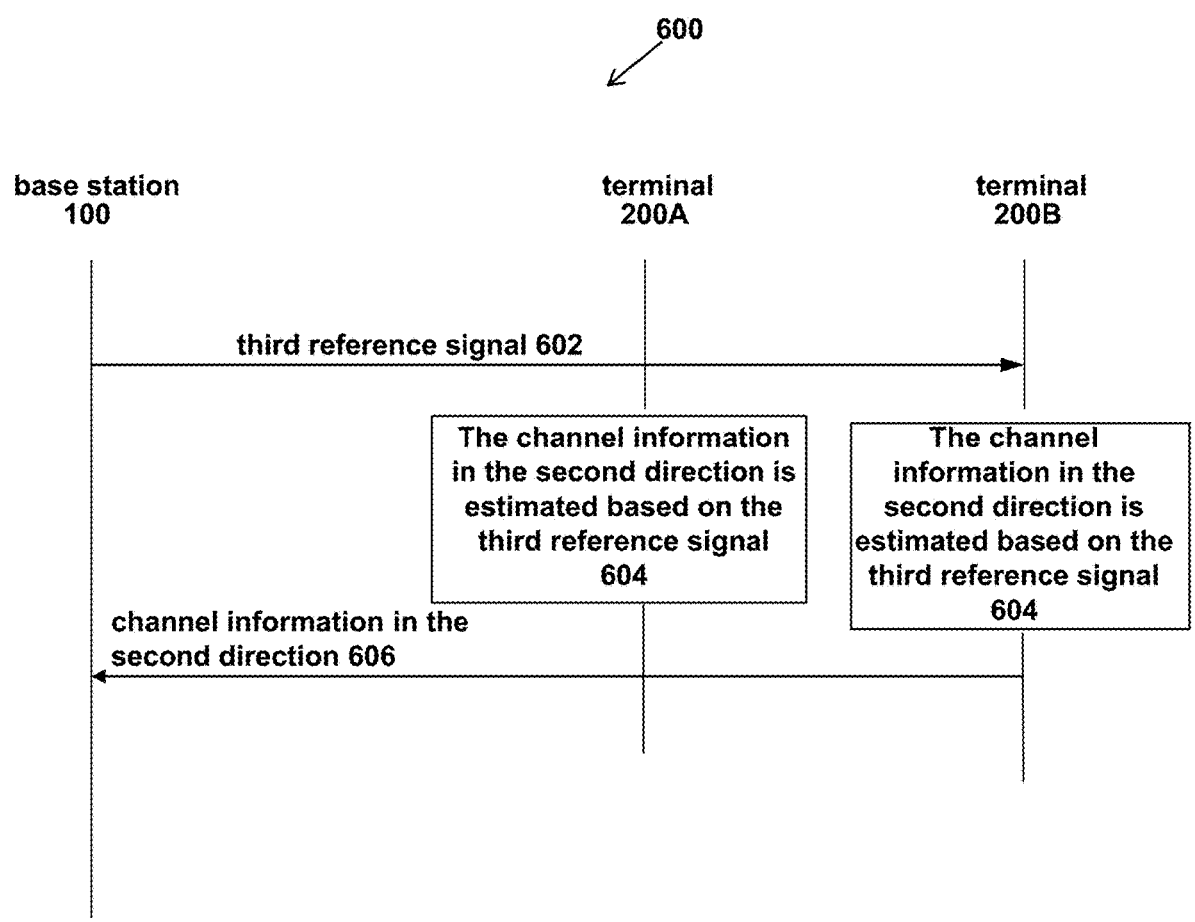
FIG. 6A is a schematic diagram showing a second measurement process of a communication system according to some embodiments of the present disclosure.

FIG. 6A is a schematic diagram showing a second measurement process 600 of a communication system according to some embodiments of the present disclosure.

Figure 6B:
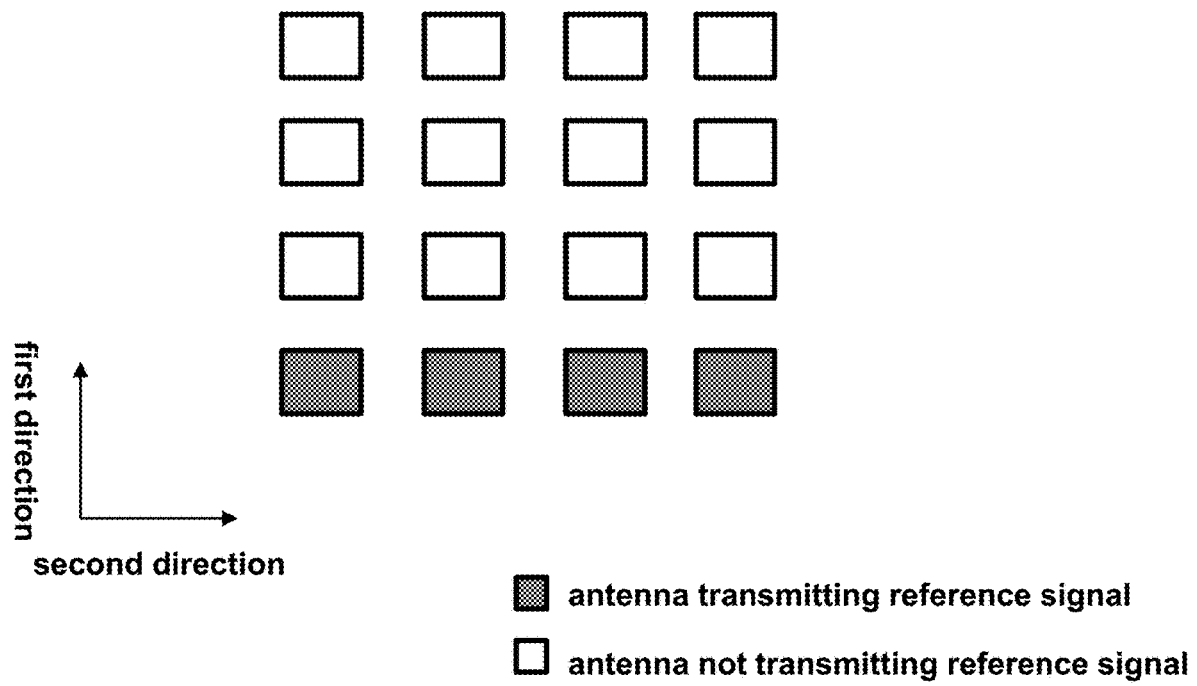
FIG. 6B is a schematic diagram showing the transmission of a third reference signal in a second direction through antennas according to some embodiments of the present disclosure.

In step 602, the base station 100 transmits a third reference signal in the second direction to the terminals 200A, 200B. The terminals 200A, 200B receive the third reference signal transmitted by the base station 100 in the second direction to perform a second measurement. FIG. 6B is a schematic diagram showing the transmission of the third reference signal in the second direction through antennas according to some embodiments of the present disclosure. As shown in FIG. 6B, the base station 100 selects a row of antennas in the second direction and transmits the third reference signal through the selected row of antennas. Note that although 4×4 antennas are shown in FIG. 6B, the base station 100 may also use antennas of other scales.

In step 604, terminals 200A, 200B estimate the channel information in the second direction based on the third reference signal. For example, terminals 200A, 200B may select a precoding matrix that matches the result of the second measurement from the channel codebook in the second direction. In step 606, the terminals 200A, 200B feed back the channel information in the second direction to the base station 100. For example, the terminals 200A, 200B include an indicator of the matched precoding matrix in the channel information in the second direction as fed back.

In some embodiments of the present disclosure, based on the respective channel information in the first direction fed back by the terminals 200A, 200B during the first measurement process, the base station 100 determines a common precoding parameter in the first direction for the terminals 200A, 200B to preprocess the channels in the first direction with strong correlation. Preprocessing the channels in the first direction with strong correlation can reduce the complexity of the subsequent scheme. For example, the base station 100 generates the respective precoding parameters in the first direction for the terminals 200A, 200B based on the respective channel information in the first direction fed back by the terminals 200A, 200B. The base station 100 takes a constant multiple of a weighted average of the respective precoding parameters in the first direction for the terminals 200A, 200B as the common precoding parameter in the first direction.

Figure 6C:
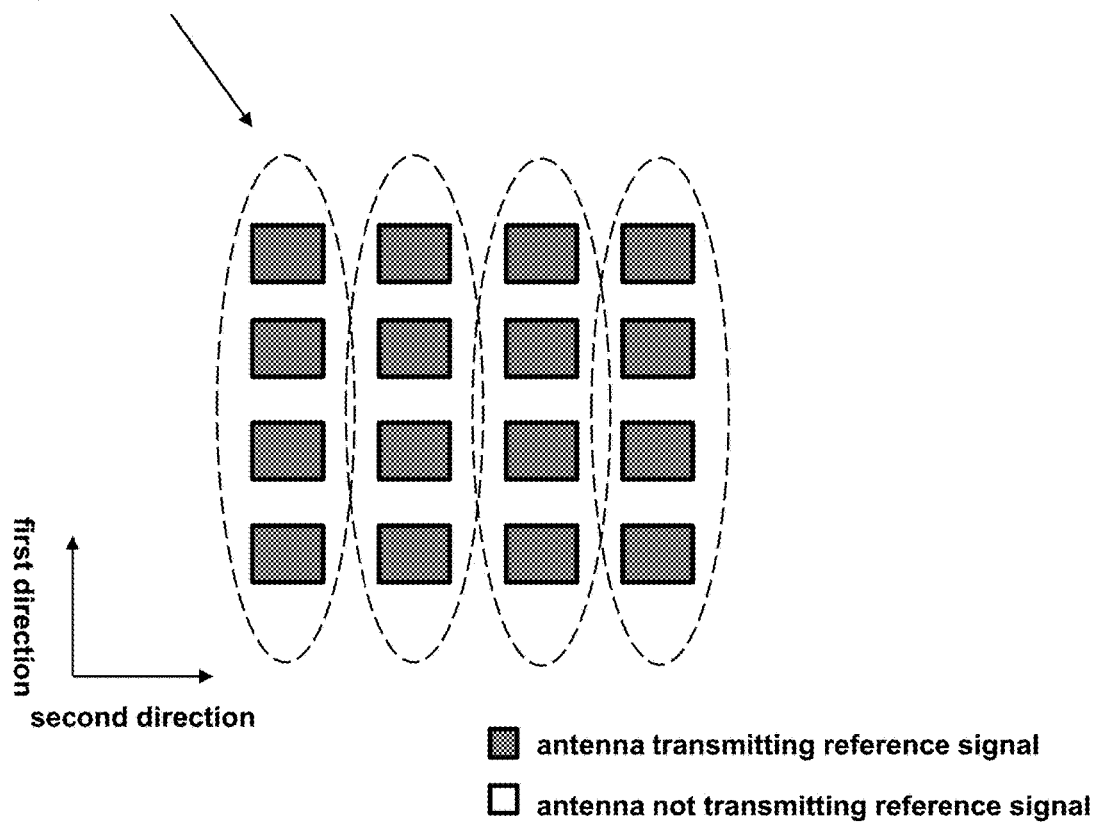
FIG. 6C is a schematic diagram showing the transmission of a third reference signal that is linearly preprocessed with a common precoding parameter in the first direction through antennas according to some embodiments of the present disclosure.

In some embodiments of the present disclosure, during the second measurement process, the base station 100 transmits to the terminals 200A, 200B a third reference signal that is linearly preprocessed with the common precoding parameter in the first direction. FIG. 6C is a schematic diagram showing the transmittion of the third reference signal that is linearly preprocessed with the common precoding parameter in the first direction through antennas according to some embodiments of the present disclosure. Unlike FIG. 6B, in FIG. 6C, the base station 100 transmits the third reference signal on each row of antennas in the second direction, and within each column of antennas in the first direction, the signals to be transmitted through the column of antennas are linearly preprocessed with the common precoding parameter in the first direction. Note that although 4×4 antennas are shown in FIG. 6B, the base station 100 may also use antennas of other scales. Terminals 200A, 200B receive the third reference signal that is linearly preprocessed with the common precoding parameter in the first direction from the base station 100. The terminals 200A, 200B determine respective channel information in the second direction based on the third reference signal received from the base station 100 that is linearly preprocessed with the common precoding parameter. In the case where the third reference signal is linearly preprocessed with the common precoding parameter in the first direction, the channels estimated by the terminals 200A, 200B are equivalent channels in the second direction. At this point, the channel information in the second direction fed back by the terminals 200A, 200B indicates equivalent channels in the second direction.

In some embodiments of the present disclosure, based on the respective channel information in the second direction fed back by the terminals 200A, 200B, the base station 100 determines respective precoding parameters in the second direction for the terminals 200A, 200B.

Taking the FD-MIMO system under the usual outdoor user distribution as an example, denote $H_k \in \mathbb{C}^{M_y \times M_x}$ as the channel between the base station 100 and the k-th terminal, wherein $M_y$, $M_x$ are the numbers of antennas of the base station 100 in the first direction and the second direction, respectively. In a case where the angle expansion in the first direction is small (for example, the angle expansion in the vertical direction in the FD-MIMO system under the usual outdoor user distribution is small), $H_k$ can be approximately expressed as:

$$H_k = h_{e,k} \otimes \sum_{p=1}^{P} \rho_k^p (h_{a,k}^p)^T = h_{e,k} \otimes \tilde{h}_{a,k}^T$$

wherein $h_{e,k}$ is approximately the channel-oriented vector in the first direction, $h_{a,k}^p$ is the channel-oriented vector in the second direction of the p-th path, $\rho_k^p$ is the corresponding large-scale fading coefficient, $\otimes$ is KP operator. Therefore, in this scenario, the approximate $h_{e,k}$ can be obtained first for linear preprocessing in the first direction.

Firstly, the condition that should be satisfied by the linear preprocessing of NLP in the first direction is derived. Denote $H=[\text{cvec}(H_1), \ldots, \text{cvec}(H_K)]^T \in \mathbb{C}^{M_y \times M_x}$, as the downlink channels of the k terminals, $\text{cvec}(\cdot)$ as column vectorization. $P \in \mathbb{C}^{M_y \times M_x \times K}$ is the total precoding matrix, which should have the following KP structure:

$$P=[p_{e,1} \otimes p_{a,1}, \ldots, p_{e,K} \otimes p_{a,K}]$$

wherein $p_{e,k}$ and $p_{a,k}$ are precoding vectors for the k-th terminal in the first direction and the second direction, respectively. After linear preprocessing is carried out in the first direction with the precoding vector $p_{e,k}$ in the first direction, the equivalent channel $H_{eq} \in \mathbb{C}^{K \times M_x}$ in the second direction is derived and is precoded in the second direction with the precoding matrix $P_\alpha$ in the second direction as follows:

$$HP=T=H_{eq}P_\alpha$$

wherein the precoding matrix in the second direction is $P_\alpha=[p_{\alpha,1}, \ldots, p_{\alpha,K}] \in \mathbb{C}^{M_y \times K}$. The k-th, k'-th element $t_{kk'}$ of T can be expressed as follows:

$$t_{kk'} = \sum_{i=1}^{M_x} p_{\alpha,k',i}(h_{k,i}^T p_{e,k'}) = \sum_{i=1}^{M_x} p_{\alpha,k',i} h_{eq,k,i}$$

Wherein $p_{\alpha,k',i}$ is the i-th element of $p_{\alpha,k'}$, $h_{k,i}$ is the i-th column of $H_k$, $h_{eq,k,i}$ is the element of the i-th column and the k-th row. In order to make $h_{k,i}^T p_{e,k'} = h_{eq,k,i}$, $p_{e,k'}$ should be independent of k', that is, $p_{e,k'}=p_e$. This indicates that it is necessary to use the same precoding vector in the first direction for the K terminals, that is, a common precoding vector or a common precoding parameter.

Denote that the channel in the first direction as $H_e=[h_{e,1}, \ldots, h_{e,K}]^T \in \mathbb{C}^{K \times M_y}$, the precoding matrix in the first direction can be selected as $P_e=\varphi_e(H_e) \in \mathbb{C}^{M_y \times K}$. In some embodiments of the present disclosure, $\varphi_e(H_e)$ may represent the calculation of a pseudo inverse of the channel $H_e$ in the first direction. In some embodiments of the present disclosure, $\varphi_e(H_e)$ may represent a QR decomposition of channel $H_e$ in the first direction, and the unitary matrix derived from the QR decomposition is used as a precoding matrix $P_e$ in the first direction.

In some embodiments of the present disclosure, the weighted sum of $P_e(:,k)$ is used as a common precoding parameter $p_e$, namely:

$$p_e = \sum_{k=1}^{K} \alpha_k P_e(:,k),$$

Wherein $\alpha_k$ is a weighted coefficient, and $\Sigma_{k=1}^{K} \alpha_k=1$. In the case of $\alpha_k=1/K$, the common precoding parameter $p_e$ is the mean value of $P_e(:,k)$. The calculation method of the common precoding parameter will affect the final performance of the system, so it can be specially designed according to different FD-MIMO systems.

In the case where the second reference signal is linearly preprocessed with the common precoding parameter in the first direction, the channels estimated by the terminals 200A, 200B are equivalent channels in the second direction. The equivalent channel $H_{eq}$ in the second direction can be expressed as follows:

$$H_{eq}=[h_{eq,1},\ldots,h_{eq,K}]^T=[H_1^T p_e,\ldots,H_K^T p_e]^T$$

In the TDD system, terminals 200A, 200B transmit the second reference signals in the first direction to the base station 100 during the first measurement process. The base station 100 estimates the channel information in the first direction based on the second reference signals in the first direction received from the terminals 200A, 200B. The terminals 200A, 200B transmit a third reference signals in the second direction to the base station 100 during the second measurement process. The base station 100 estimates the channel information in the second direction based on the third reference signals in the second direction received from the terminals 200A, 200B. The common precoding parameter in the first direction and the channel information in the second direction are used to calculate the equivalent channel $H_{eq}$ in the second direction as follows:

$$H_{eq}=[h_{eq,1},\ldots,h_{eq,K}]^T=[H_1^T p_e,\ldots,H_K^T p_e]^T$$

The precoding matrix in the second direction can be calculated by the function $\varphi_\alpha$, that is, $P_\alpha=\varphi_\alpha(H_{eq})\in\mathbb{C}^{M_s\times K}$. In some embodiments of the present disclosure, $\varphi_\alpha(H_{eq})$ may represent a QR decomposition of the equivalent channel $H_{eq}$ in the second direction, and the unitary matrix derived from the QR decomposition is used as the precoding matrix $P_e$ in the second direction. For example, the $H_{eq}$ is QR decomposed as $H_{eq}=LN_\alpha^H$, wherein the matrix $L\in\mathbb{C}^{K\times K}$ is a lower triangular matrix and the precoding matrix $P_\alpha$ in the second direction is a unitary matrix.

The total precoding matrix can be selected as $P=p_e\otimes P_\alpha$, that is, the Kronecker product of the common precoding vector $p_e$ in the first direction and the precoding matrix $P_\alpha$ in the second direction. Therefore, the equivalent channel after the precoding is:

$$HP=T=H_{eq}P_\alpha=L$$

By selecting different $\varphi_e$ and $\varphi_\alpha$, NLP algorithms with different performance can be designed.

Back to FIG. 4, in step 412, the base station 100 determines a precoding scheme for the data to be transmitted from the base station 100 to the terminals 200A, 200B based on the channel information in the second direction, and transmits a second indication signal to indicate the determined precoding scheme. The precoding scheme includes linear precoding or non-linear precoding. In response to receiving the second indication signal, the terminals 200A, 200B demodulate the data transmitted from the base station 100 according to the precoding scheme indicated therein.

The second indication signal may be, for example, one bit in the control signaling (e.g., RRC signaling). Different precoding schemes may be indicated by assigning different values to the second indication signal. For example, the second indication signal may be set to 0 to represent the linear precoding, the second indicator signal may be set to 1 to represent the non-linear precoding, and vice versa. In some embodiments of the present disclosure, more bits may be allocated to the second indication signal so that the second indication signal can carry more information. It should be noted that the final precoding scheme of the present disclosure is actually a two-dimensional hybrid precoding scheme, which may be non-linear precoding in the first direction and linear precoding in the second direction, or linear precoding in the first direction and non-linear precoding in the second direction, while the final precoding scheme as indicated by the second indicator signal depends on the type of precoding performed in the second direction. The purpose of the indication is to enable the terminal to determine whether to perform a modulus operation on the received signal.

In some embodiments of the present disclosure, the base station 100 estimates the equivalent channel correlation between the terminals 200A, 200B in the second direction based on the respective channel information fed back by the terminals 200A, 200B in the second direction during the second measurement process. In response to the estimated equivalent channel correlation between terminals 200A, 200B in the second direction being higher than a second correlation threshold, the base station 100 transmits a second indication signal indicating that the precoding scheme for the data to be transmitted from the base station 100 to the terminals 200A, 200B is the non-linear precoding. In response to the estimated equivalent channel correlation between terminals 200A, 200B in the second direction being lower than the second correlation threshold, the base station 100 transmits the second indication signal indicating that the precoding scheme for the data to be transmitted from the base station 100 to the terminals 200A, 200B is the linear precoding.

The equivalent channel correlation in the second direction can be calculated by the condition number $\text{cond}(H_{eq})$ of the equivalent channels in the second direction. When the $\text{cond}(H_{eq})$ is greater than the second correlation threshold, the non-linear precoding is used, otherwise the linear precoding is used. It is also possible to presuppose the use of the linear precoding to calculate current SINR of a terminal. If the SINR is less than a set threshold, the non-linear precoding is used, otherwise the linear precoding is used.

In some embodiments of the present disclosure, the base station 100 transmits the second reference signal to the terminals 200A, 200B at a first interval during the first measurement process, and the third reference signal from the base station 100 to the terminals 200A, 200B at a second interval during the second measurement process. The terminals 200A, 200B receive the second reference signal transmitted at the first interval from the base station 100 during the first measurement process. The terminals 200A, 200B receive the third reference signal transmitted at the second interval from the base station during the second measurement process.

In some embodiments of the present disclosure, after the base station 100 determines to use the non-linear precoding, the base station 100 shortens the transmission period of the third reference signal transmitted during the second measurement process so that the second interval is shorter than the first interval, thereby obtaining more accurate channel information in the second direction.

In step 414, the base station 100 precodes data with the determined precoding scheme and transmits the precoded data to the terminals 200A, 200B. In step 416, the terminals 200A, 200B demodulate the data based on the precoding scheme indicated in the second indication signal. In some embodiments of the present disclosure, in response to the second indication signal indicating that the precoding scheme is the non-linear precoding scheme, terminals 200A, 200B perform the modulo operation on the received data signal to demodulate the data.

The linear precoding that can be used includes Matched Filter (MF) precoding, Zero Forcing (ZF) precoding and Minimum Mean Square Error (MMSE) precoding. The non-linear precoding that can be used includes Tomlinson-Harashima precoding (THP), Vector Perturb (VP) and the like. Traditional THP precoding structure is described in C. Windpassinger, R. F. H. Fischer, T. Vencel, and J. B. Huber, "Precoding in multiantenna and multiuser communications," IEEE Trans. Wirel. Commun., vol. 3, no. 4, pp. 1305-1316, July 2004, all of which is incorporated herein by reference. The present disclosure makes corresponding improvements to the traditional THP precoding structure.

Figure 7:
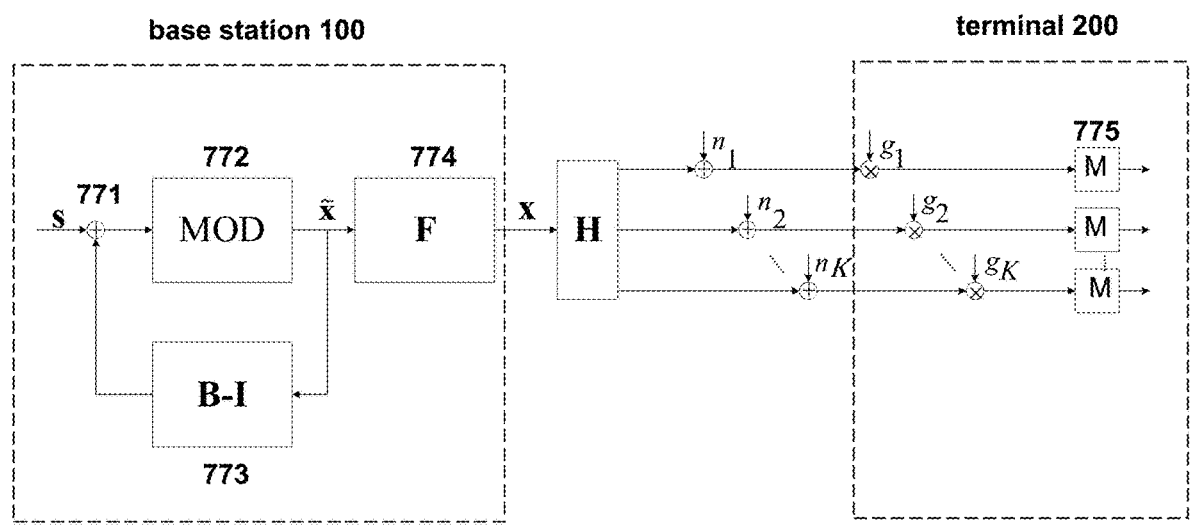
FIG. 7 is a schematic diagram showing the non-linear precoding and demodulation of a communication system which conforms to the THP precoding structure according to some embodiments of the present disclosure.

FIG. 7 is a schematic diagram showing the non-linear precoding and the demodulation of the communication system according to some embodiments of the present disclosure, which conforms to the THP precoding structure. As shown in FIG. 7, the base station 100 includes an adder 771, a transmitting MOD module 772, a feedback filter 773, a forward filter 774, and a terminal 200 includes a receiving MOD module 775.

The transmitting MOD module 772 receives the output of the adder 771 and performs a modulo operation on the output of the adder 771 to limit its power. The feedback filter 773 receives the output $\tilde{x}$ of the transmitting MOD module 772 and performs an interference cancellation operation on the $\tilde{x}$ using a lower triangular matrix L. The adder 771 adds the input signal s and the output of the feedback filter 773. The forward filter 774 receives the output $\tilde{x}$ of the transmitting MOD module 772 and performs a forward filtering on the output $\tilde{x}$ with the precoding parameter to obtain the transmitting signal x.

In some embodiments of the present disclosure, the base station 100 determines the precoding parameter for the data to be transmitted to the terminals 200A, 200B based on the Kronecker product of the common precoding parameter in the first direction and the respective precoding parameters in the second direction for the terminals 200A, 200B. For example, for the data to be transmitted to the terminals 200A, 200B, the data is forward filtered in the forward filter 774 with the total precoding matrix $P=p_e \otimes P_\alpha$ as the precoding parameter.

Take M-QAM modulation as an example, denote $A=\sqrt{M}$, and the signal vector to be transmitted is $s \in \mathbb{C}^{K \times 1}$, then the output $\tilde{x}$ of the transmitting MOD module 772 is as follows:

$$\tilde{x}_k = \text{mod}_A \left( s_k - \sum_{j=1}^{k-1} \frac{l_{kk}}{l_{kj}} \tilde{x}_j \right)$$

wherein the modulo operation is $$\text{mod}_A(\varepsilon) = \varepsilon - 2A \left\lfloor \frac{\varepsilon + A + jA}{2A} \right\rfloor$$

$\lfloor \cdot \rfloor$ is a round-down operation.

The transmitting signal x arrives at the terminal 200 via channel H. The terminal 200 demodulates the received signal y with the receiving matrix $G=[g_1, \ldots, g_K]$ as the demodulation parameter, and performs the modulo operation on the processed signal in the receiving MOD module 775.

In some embodiments of the present disclosure, the base station 100 determines the demodulation parameter for the non-linear demodulation at the terminal 200 based on the channel information in the second direction. In some embodiments of the present disclosure, the receiving matrix which is the demodulation parameter is $G=[g_1, \ldots, g_K]=[l_{11}^{-1}, \ldots, l_{KK}^{-1}]$, wherein $l_{kk}^{-1}$ is an element on the diagonal of the lower triangular matrix L. The received signal y after being processed by the receiving matrix G is $$y' = Gy = GHP\tilde{x} = GH_{eq}P_\alpha \tilde{x} + Gn$$

The final receiving symbol can be recovered by performing the same modulo operation at the receiver, that is, $s_k = \text{mod}_A(y_k')$.

When the non-linear precoding is used, the k-th receiver needs to know in advance the receiving matrix G as the demodulation parameter. The base station 100 may transmit the receiving matrix G as the demodulation parameter to the terminal 200 in the second indication signal. The terminal 200 receives the demodulation parameter for the non-linear demodulation from the base station 100.

Alternatively, the base station 100 may transmit the demodulated reference signal (DMRS), so that the terminal 200 estimates the receiving matrix G as the demodulation parameter according to the DMRS. Because the DMRS needs to be used to estimate the receiving matrix G of the receiver, the DMRS can not perform the non-linear precoding. Therefore, in some embodiments of the present disclosure, the base station 100 transmits the DMRS which is not non-linearly precoded for determining the demodulation parameter to the terminal 200. The terminal 200 receives the DMRS which is not non-linearly precoded from the base station 100 to determine the demodulation parameter for the non-linear demodulation.

If ZF precoding is adopted, the base station 100 transmits a DMRS vector $\phi_{ZF} \in \mathbb{C}^{K \times 1} = [\phi_1, \ldots, \phi_K]^T$, then the equivalent channel coefficient of the k-th terminal after precoding is $y_{ZF,k}/\phi_k$, wherein $y_{ZF,k}$ is the receiving signal of the k-th user.

Under the non-linear precoding scheme, the base station 100 transmits the DMRS which includes K orthogonal sequences, K is the number of terminals 200. Denote $\phi_{THP} \in \mathbb{C}^{K \times K} = [\phi_1, \ldots, \phi_K]^T$ as an orthogonal DMRS sequence, that is, $\phi_i^H \phi_j = 0$, $i \neq j$. In this case, G can be estimated by $Y\phi_{THP}^H$, wherein Y is the receiving signal vector. In this case, the length of the DMRS sequence is K×K, which is longer than the DMRS sequence with the length of K×1 of ZF. Therefore, the DMRS sequence length information under the non-linear precoding scheme may be included in the second signal and transmitted to the terminal 200.

Under the millimeter wave hybrid precoding architecture, the precoding includes baseband digital precoding and radio frequency (RF) analog precoding. The precoding schemes in some embodiments of the present disclosure can be applied to baseband digital precoding to further reduce inter-terminal interference of strongly correlated channels after analog precoding/beamforming. In particular, denote $F_{BB} \in \mathbb{C}^{N_y N_x \times K}$ and $F_{RF} \in \mathbb{C}^{M_y M_x \times N_y N_x}$ as the digital and analog precoding matrices, respectively, wherein $N_y$, $N_x$ are the number of RF links in the first direction and the second direction, respectively, then the signal transmission model is as follows:

$$y' = Gy = GHF_{RF}F_{BB}\tilde{x} + Gn$$

Wherein $\tilde{x}$ is the transmitting signal after THP modulo operation, and G is the receiving matrix. The equivalent baseband channel $HF_{RF}$ after analog precoding may still be a strongly correlated channel, such as when several terminals are located in the same beam, and in this case the precoding scheme in some embodiments of the present disclosure can be applied to the $HF_{RF}$ to further reduce inter-terminal interference.

Figure 8:
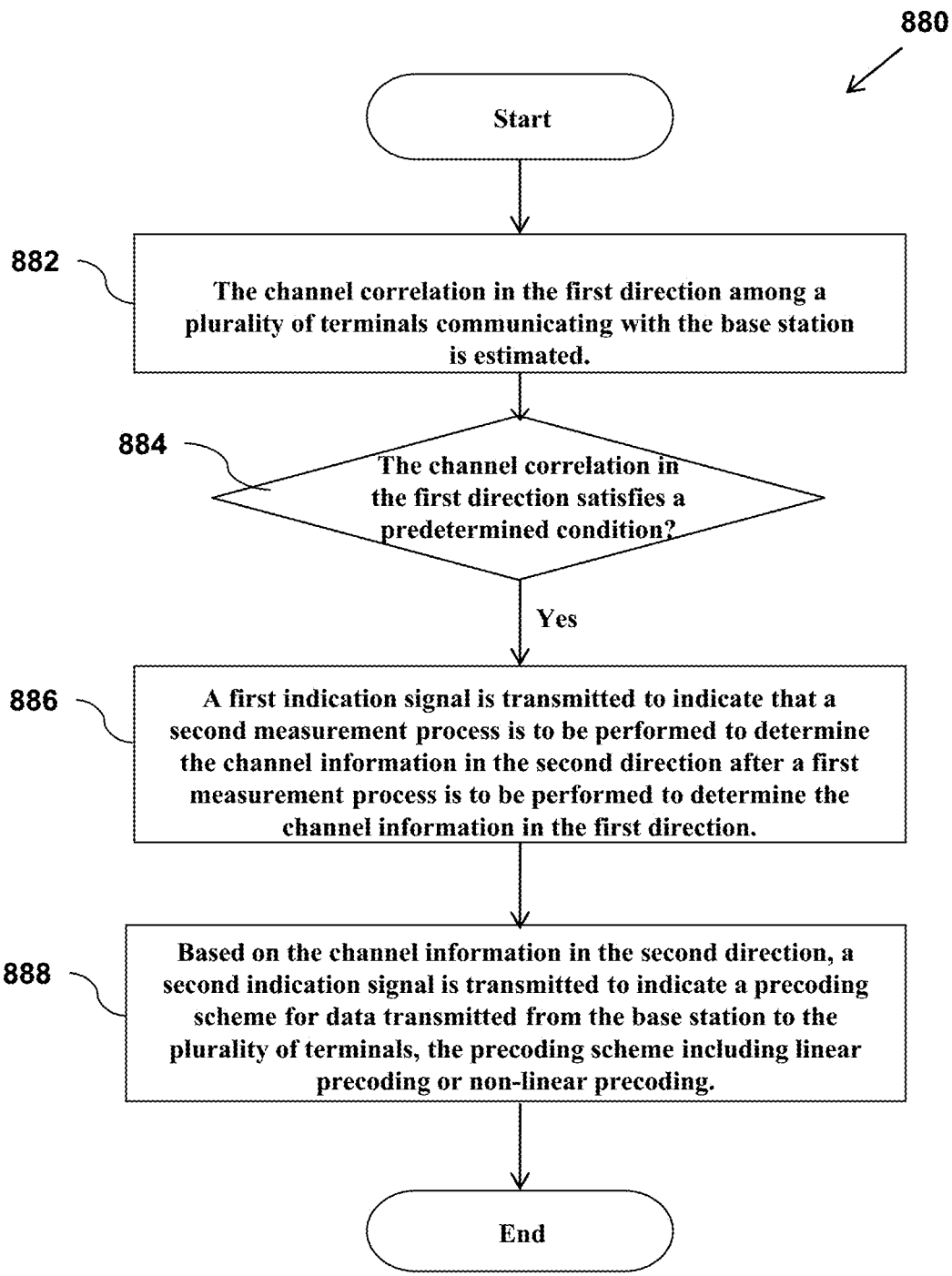
FIG. 8 is a flowchart showing a communication method performed on the base station side according to some embodiments of the present disclosure.

FIG. 8 is a flowchart showing a communication method 880 performed on the base station side according to some embodiments of the present disclosure.

At step 882, the channel correlation in the first direction among a plurality of terminals communicating with the base station is estimated. In step 884, it is determined whether the channel correlation in the first direction among the plurality of terminals satisfies a predetermined condition. In step 886, in response to the estimated channel correlation in the first direction among the plurality of terminals satisfies the predetermined condition, a first indication signal is transmitted to indicate that a second measurement process is to be performed to determine the channel information in the second direction after a first measurement process is to be performed to determine the channel information in the first direction. In step 886, based on the channel information in the second direction, a second indication signal is transmitted to indicate a precoding scheme for data to be transmitted from the base station to the plurality of terminals, the precoding scheme including linear precoding or non-linear precoding.

The specific implementation of the above steps has been described in detail with reference to FIG. 4, so it will not be repeated here.

Figure 9:
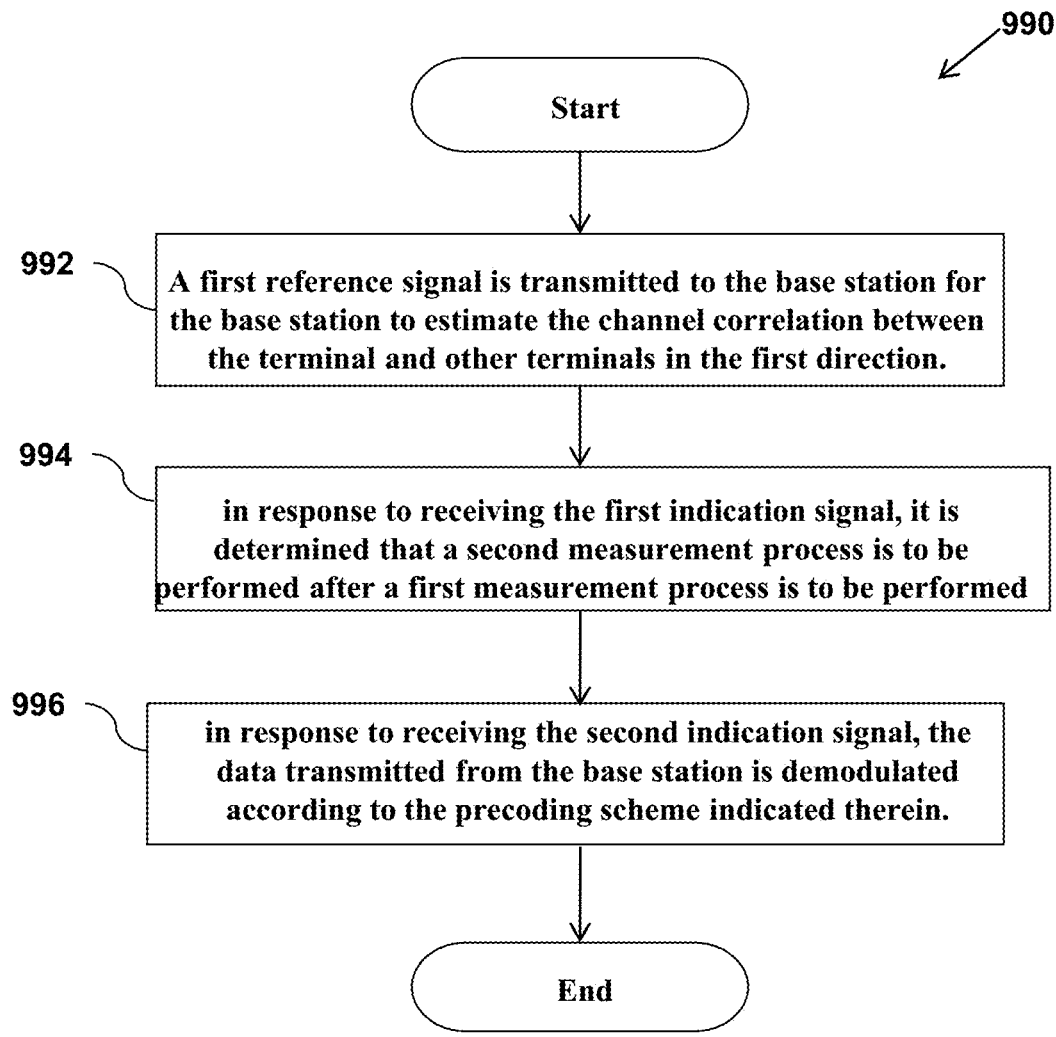
FIG. 9 is a flowchart showing a communication method performed on the terminal side according to some embodiments of the present disclosure.

FIG. 9 is a flowchart showing a communication method 990 performed on the terminal side according to some embodiments of the present disclosure.

In step 992, a first reference signal is transmitted to the base station for the base station to estimate the channel correlation between the terminal and other terminals in the first direction. In step 994, in response to receiving the first indication signal, it is determined that a second measurement process is to be performed after a first measurement process is to be performed, wherein the first measurement is performed and the channel information in the first direction is fed back during the first measurement process, and the second measurement is performed and the channel information in the second direction is fed back during the second measurement process. In step 996, in response to receiving the second indication signal, the data transmitted from the base station is demodulated according to the precoding scheme indicated therein, the precoding scheme including linear precoding or non-linear precoding. The first indication signal is transmitted by the base station in response to determining that the channel correlation between the terminal and other terminals in the first direction satisfies a predetermined condition, and the second indication signal is transmitted by the base station based on the channel information in the second direction fed back by the terminal.

The specific implementation of the above steps has been described in detail with reference to FIG. 4, so it will not be repeated here.

Figure 10:
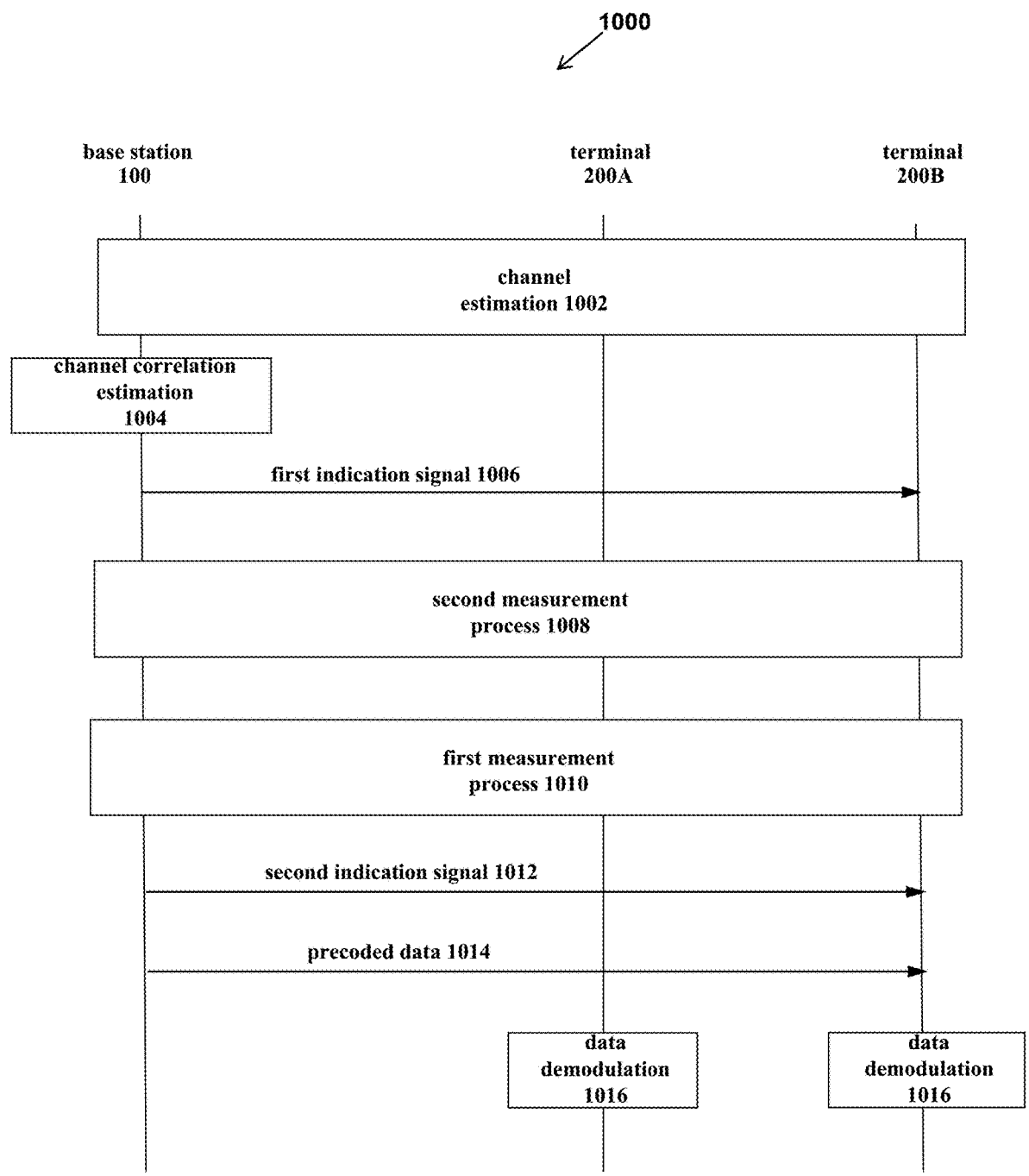
FIG. 10 is a schematic diagram showing a process flow of a communication system according to some embodiments of the present disclosure.

FIG. 10 is a schematic diagram showing a process flow 1000 of a communication system according to some embodiments of the present disclosure. Steps 1002, 1004 of the process flow 1000 in FIG. 10 are the same as steps 402, 404 of the process flow 400 in FIG. 4, so they will not be repeated.

In step 1006, when it is determined that the channel correlation in the first direction does not satisfy a predetermined condition, the base station 100 transmits a first indication signal to indicate that a first measurement process is to be performed to determine the channel information in the first direction after performing a second measurement process to determine the channel information in the second direction.

In step 1008, the base station 100 and terminals 200A, 200B perform the second measurement process to determine the channel information in the second direction. In some embodiments of the present disclosure, the base station 100 determines the common precoding parameter of the terminals 200A, 200B in the second direction based on the respective channel information in the second direction fed back by the terminals 200A, 200B during the second measurement process. For example, the base station 100 generates the respective precoding parameters of the terminals 200A, 200B in the second direction based on the respective channel information in the second direction fed back by the terminals 200A, 200B. The base station 100 takes a constant multiple of a weighted average of the respective precoding parameters of the terminals 200A, 200B in the second direction as the common precoding parameter in the second direction.

In step 1010, the base station 100 and terminals 200A, 200B perform the first measurement process to determine the channel information in the first direction. In some embodiments of the present disclosure, during the first measurement process, the base station 100 transmits to the terminals 200A, 200B a second reference signal that is linearly preprocessed with the common precoding parameter in the second direction. The terminals 200A, 200B determine the respective channel information in the first direction based on the second reference signal which is linearly preprocessed with the common precoding parameter received from the base station 100. In the case where the second reference signal is linearly preprocessed with the common precoding parameter in the second direction, the channels estimated by the terminals 200A, 200B are equivalent channels in the first direction. At this point, the channel information in the first direction fed back by the terminals 200A, 200B indicates the equivalent channels in the first direction.

In the TDD system, terminals 200A, 200B transmit third reference signals in the second direction to the base station 100 during the second measurement process. The base station 100 estimates the channel information in the second direction based on the third reference signals in the second direction received from the terminals 200A, 200B. The terminals 200A, 200B transmit second reference signals in the first direction to the base station 100 during the first measurement process. The base station 100 estimates the channel information in the first direction based on the second reference signals in the first direction received from the terminals 200A, 200B. The base station 100 calculates the equivalent channels in the first direction based on the common precoding parameter in the second direction and the channel information in the first direction.

In step 1012, the base station 100 determines a precoding scheme for the data to be transmitted from the base station 100 to the terminals 200A, 200B based on the channel information in the first direction, and transmits a second indication signal to indicate the determined precoding scheme. The precoding scheme includes linear precoding or non-linear precoding.

In some embodiments of the present disclosure, the base station 100 estimates the equivalent channel correlation in the first direction between the terminals 200A, 200B based on the respective channel information in the first direction fed back by the terminals 200A, 200B during the first measurement process. In response to that the estimated equivalent channel correlation in the first direction between the terminals 200A, 200B is higher than a second correlation threshold, the base station 100 transmits the second indication signal indicating that the precoding scheme for the data to be transmitted from the base station 100 to the terminals 200A, 200B is the non-linear precoding. In response to that the estimated equivalent channel correlation in the first direction between terminals 200A, 200B is lower than the second correlation threshold, the base station 100 transmits the second indication signal indicating that the precoding scheme for the data to be transmitted from the base station 100 to the terminals 200A, 200B is the linear precoding.

The equivalent channel correlation in the first direction can be calculated by the condition number of the equivalent channel in the first direction. When the condition number of the equivalent channel in the first direction is greater than a second correlation threshold, the non-linear precoding is adopted, otherwise the linear precoding is adopted. It is also possible to presuppose to use the linear precoding to calculate the SINR of the terminal at this point. If the SINR is less than a set threshold, the non-linear precoding is used, otherwise the linear precoding is used.

In some embodiments of the present disclosure, the base station 100 transmits the second reference signal to the terminals 200A, 200B at a first interval during the first measurement process, and the third reference signal from the base station 100 to the terminals 200A, 200B at a second interval during the second measurement process. In some embodiments of the present disclosure, after the base station 100 determines to use the non-linear precoding, the base station 100 shortens the transmission period of the second reference signal transmitted during the first measurement process to obtain more accurate channel information in the first direction.

In step 1014, the base station 100 precodes the data with the determined precoding scheme and transmits the precoded data to the terminals 200A, 200B. In step 1016, the terminals 200A, 200B demodulate the data based on the precoding scheme indicated in the second indication signal.

In some embodiments of the present disclosure, the base station 100 determines the precoding parameter for the data to be transmitted to the terminals 200A, 200B based on the Kronecker product of the common precoding parameter in the second direction and the respective precoding parameters in the first direction for the terminals 200A, 200B.

In some embodiments of the present disclosure, the base station 100 determines the demodulation parameters for the non-linear demodulation at the terminals 200A, 200B based on the channel information in the first direction, and transmits the demodulation parameters to the terminals 200A, 200B in the second indication signal.

The specific implementation of the above steps has been described in detail earlier with reference to FIG. 4, and it will not be repeated here.

In the embodiments described above, the base station 100 and the terminals 200A, 200B sequentially perform the first measurement process and the second measurement process to estimate the downlink channel in the first direction and the downlink channel in the second direction. The base station 100 then determines whether the non-linear precoding is required and the corresponding precoding parameter. In some embodiments of the present disclosure, the base station 100 and the terminals 200A, 200B may estimate both the downlink channel in the first direction and the downlink channel in the second direction during a single measurement process. The base station 100 then determines whether the non-linear precoding is required and the corresponding precoding parameter. The process flow in these embodiments will be described in detail below with reference to FIG. 11.

Figure 11:
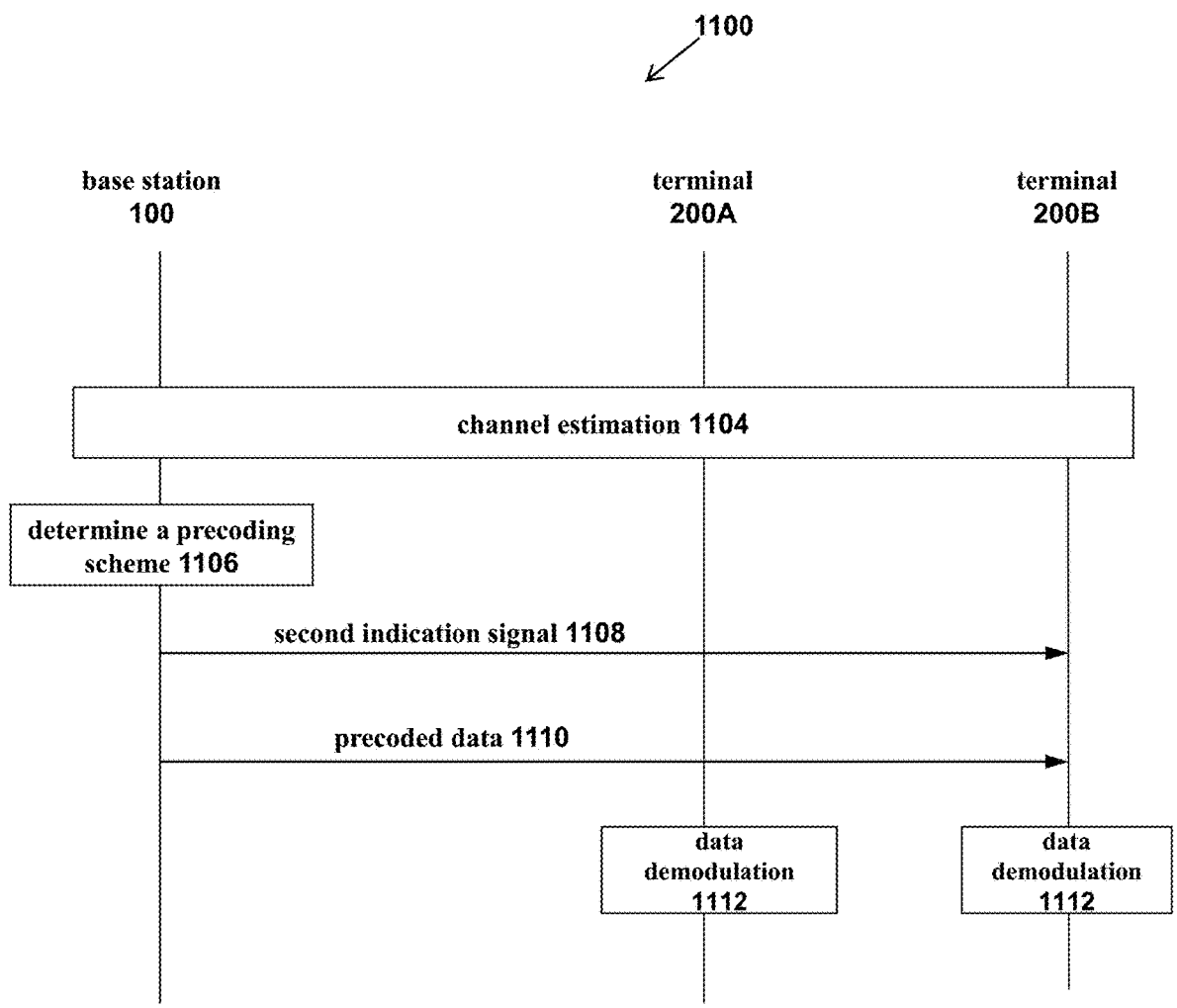
FIG. 11 is a schematic diagram showing a process flow of a communication system according to some embodiments of the present disclosure.

FIG. 11 is a schematic diagram showing a process flow 1100 of a communication system according to some embodiments of the present disclosure. In step 1104, the base station 100 and terminals 200A, 200B perform a channel estimation process. In some embodiments of the present disclosure, the base station 100 transmits a first reference signal on antennas in both the first direction and the second direction. Terminals 200A, 200B receive the first reference signal from the base station 100 and feed back to the base station 100 the estimated downlink channel in the first direction and downlink channel in the second direction.

Under the TDD communication mechanism, the uplink channel and the downlink channel are reciprocal. Therefore, in some embodiments of the present disclosure, the terminals 200A, 200B transmit the first reference signals to the base station 100. The base station 100 estimates the downlink channels in the first direction and the downlink channels in the second direction of the terminals 200A, 200B based on the first reference signals received from the terminals 200A, 200B by antennas in the first direction and the second direction using the reciprocity of the uplink and downlink channels.

In step 1106, the base station 100 determines a precoding scheme based on the estimated downlink channels in the first direction and downlink channels in the second direction of the terminals 200A, 200B.

In some embodiments of the present disclosure, the base station 100 estimates the channel correlation in the first direction between the terminals 200A, 200B based on the estimated downlink channels in the first direction of the terminals 200A, 200B, and determines whether the channel correlation in the first direction satisfies a predetermined condition. In some embodiments of the present disclosure, the predetermined condition includes that the channel correlation in the first direction is higher than a first correlation threshold. In some embodiments of the present disclosure, the base station 100 estimates the channel correlation between the terminals 200A, 200B in the second direction based on the estimated downlink channels of the terminals 200A, 200B in the second direction, and the predetermined condition includes that the channel correlation in the first direction is higher than the channel correlation in the second direction.

When the channel correlation in the first direction satisfies the predetermined condition, the base station 100 determines the common precoding parameter in the first direction for the terminals 200A, 200B based on the downlink channels in the first direction of the estimated terminals 200A, 200B. In some embodiments of the present disclosure, the precoding matrix in the first direction is calculated using the function $\varphi_e$, $P_e = \varphi_e(H_e) \in \mathbb{C}^{M_y \times K}$. Moreover, the weighted sum of $P_e(:, k)$ is used as the common precoding parameter $p_e$, namely:

$$p_e = \sum_{k=1}^{K} \alpha_k P_e(:, k),$$

Wherein $\alpha_k$ is a weighted coefficient, and $\Sigma_{k=1}^{K} \alpha_k = 1$. In the case of $\alpha_k = 1/K$, the common precoding parameter $p_e$ is an average value of $P_e(:, k)$.

Then, the base station 100 determines the respective precoding parameter in the second direction for the terminals 200A, 200B based on the common precoding parameter in the first direction and the estimated downlink channels of the terminals 200A, 200B in the second direction. The equivalent channel $H_{eq}$ in the second direction can be calculated as follows:

$$H_{eq}=[h_{eq,1},\ldots,h_{eq,K}]^T=[H_1^T p_e,\ldots,H_K^T p_e]^T$$

Then, the function $\varphi_\alpha$ is used to calculate the precoding matrix $P_\alpha = \varphi_\alpha(H_{eq}) \in \mathbb{C}^{M_s \times K}$ in the second direction, and $p = p_e \otimes P_\alpha$ is taken as the total precoding matrix.

The processing of steps 1108, 1110, 1112 is the same as that of steps 412, 414, 416 in FIG. 4, and will not be repeated here. In addition, the specific implementation of the above steps has been described in detail with reference to FIG. 4, so it will not be repeated here.

Figure 12:
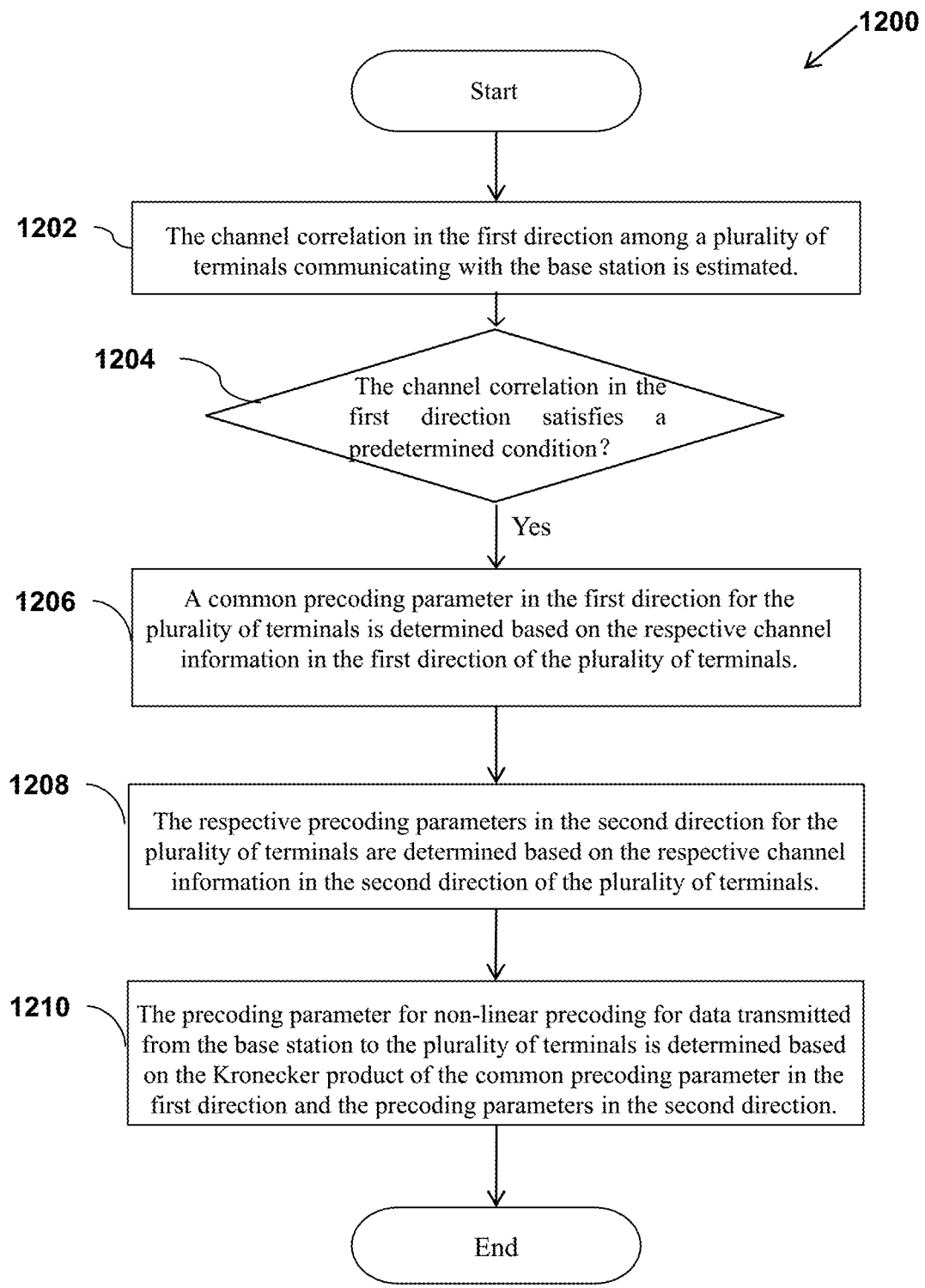
FIG. 12 is a flowchart showing a communication method performed on the base station side according to some embodiments of the present disclosure.

FIG. 12 is a flowchart showing a communication method 1200 performed on the base station side according to some embodiments of the present disclosure.

In step 1202, the channel correlation in the first direction among a plurality of terminals communicating with the base station is estimated. In step 1204 it is determined whether the estimated channel correlation in the first direction among the plurality of terminals satisfies a predetermined condition. In step 1206, a common precoding parameter in the first direction for the plurality of terminals is determined based on the respective channel information in the first direction of the plurality of terminals. In step 1208, the respective precoding parameters in the second direction for the plurality of terminals are determined based on the respective channel information in the second direction of the plurality of terminals. In step 1210, the precoding parameter for non-linear precoding for data to be transmitted from the base station to the plurality of terminals is determined based on the Kronecker product of the common precoding parameter in the first direction and the precoding parameter in the second direction. The specific implementation of the above steps has been described in detail earlier with reference to FIG. 4, and it will not be repeated here.

In the embodiments described above, the base station 100 determines whether to perform the non-linear precoding. In some embodiments of the present disclosure, whether to perform the non-linear precoding may also be determined by terminals 200A, 200B. Next, the process flow in these embodiments will be described in detail with reference to FIG. 13A.

Figure 13A:
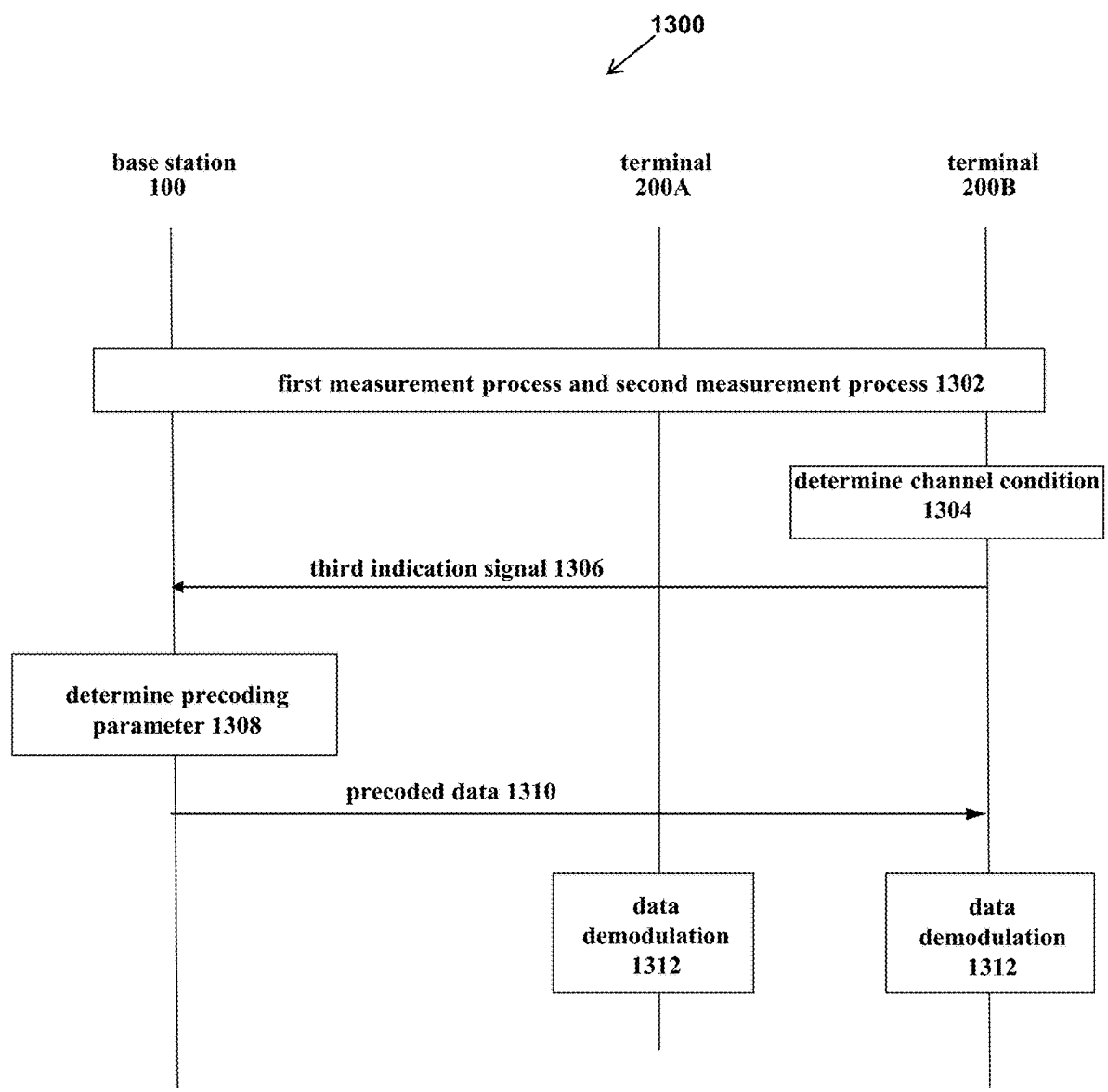
FIG. 13A-13C are schematic diagrams showing process flows of a communication system according to some embodiments of the present disclosure.

FIG. 13A is a schematic diagram showing a process flow 1300 of a communication system according to some embodiments of the present disclosure. In step 1302, the base station 100 and the terminals 200A, 200B perform a first measurement process and a second measurement process. In step 1304, the terminals 200A, 200B estimate the respective channel conditions according to the last reference signals received in step 1302 and determine whether the non-linear precoding is required at the base station 100 according to the estimated channel conditions. For example, terminals 200A, 200B detect SINRs or RSRPs based on the last reference signals received in step 1302. When the SINRs or RSRPs are low (for example, below a certain threshold), the terminals 200A, 200B send third indication signals to the base station 100 to indicate that the non-linear precoding is required at the base station 100. In step 1308, the base station 100 determines that the non-linear precoding is required in response to the receipt of the third indication signals and determines the precoding parameter for the non-linear precoding. In some embodiments of the present disclosure, the base station 100 may determine whether the non-linear precoding is required in combination with other conditions in step 1308. For example, the base station 100 may determine whether the non-linear precoding is required based on the number of terminals transmitting the third indication signals. For example, when the number of terminals transmitting the third indication signals is greater than a certain threshold number, the base station 100 determines that the non-linear precoding is required. When the number of terminals transmitting the third indication signals is less than the certain threshold number, the base station 100 determines that the non-linear precoding is not performed. The processing of steps 1310 and 1312 is the same as that of steps 414 and 416 in FIG. 4 and will not be repeated here. In addition, the specific implementation of the above steps has been described in detail with reference to FIG. 4, so it will not be repeated here.

Figure 13B:
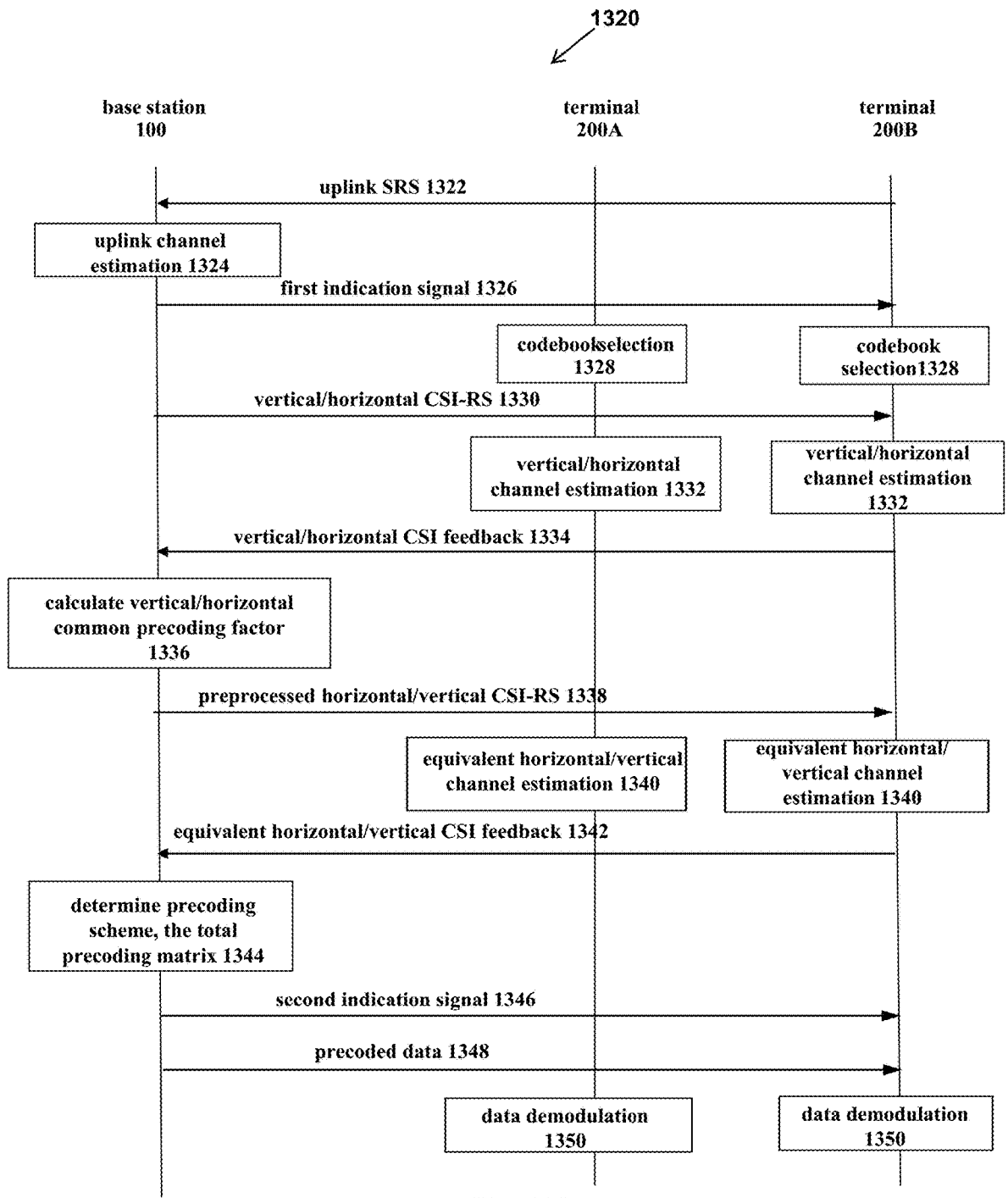
Figure 13C:
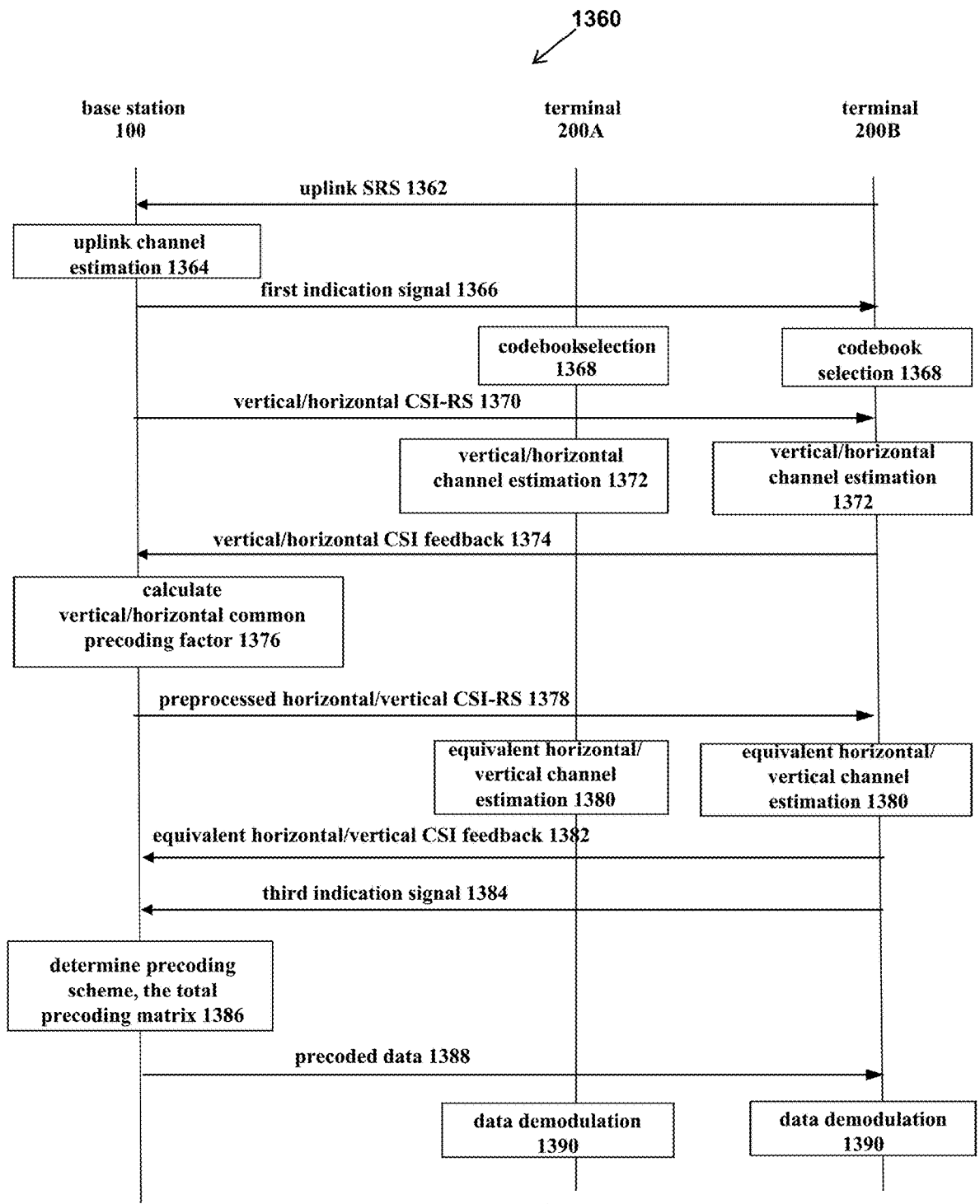

In addition, the process flow of the communication system according to some embodiments of the present disclosure may also be implemented in a more specific manner shown in FIGS. 13B and 13C.

FIG. 13B is a schematic diagram showing a process flow 1320 of a communication system according to some embodiments of the present disclosure. In FIG. 13B it is determined by the base station 100 whether the non-linear precoding scheme is required.

As shown in FIG. 13B, in step 1322, the terminals 200A, 200B transmit uplink SRSs (demodulated reference signals) to the base station 100 for the base station 100 to estimate the uplink channels of the terminals 200A, 200B. In step 1324, the base station 100 estimates the uplink channels of the terminals 200A, 200B based on the received uplink SRSs. In step 1326, the base station 100 determines the correlation in the vertical direction and the correlation in the horizontal direction between the channels of the terminals 200A, 200B based on the channel estimation result. In step 1326, when the base station 100 determines that the channel correlation in the vertical/horizontal direction satisfies a predetermined condition, a first indication signal is transmitted to indicate that the horizontal/vertical channel measurement process is to be performed to determine the channel information in the horizontal/vertical direction after performing the vertical/horizontal channel measurement process to determine the channel information in the vertical/horizontal direction. In step 1328, in response to receiving the first indication signal, the terminals 200A, 200B determine that the vertical/horizontal codebook is selected first to perform the vertical/horizontal channel measurement process, and then the horizontal/vertical codebook to perform the horizontal/vertical channel measurement process.

In step 1330, the base station 100 transmits a vertical/horizontal CSI-RSs (channel state indication reference signals) to the terminals 200A, 200B for the terminals 200A, 200B to estimate the vertical/horizontal channels. In step 1332, terminals 200A, 200B estimate vertical/horizontal channels using vertical/horizontal codebooks. In step 1334, the terminals 200A, 200B feed back the vertical/horizontal CSI (channel state information) to the base station 100. In step 1336, the base station 100 calculates the vertical/horizontal common precoding factor based on the received vertical/horizontal CSI.

In step 1338, the base station 100 transmits the horizontal/vertical CSI-RSs which are preprocessed with the vertical/horizontal common precoding factor to terminals 200A, 200B for terminal 200A, 200B to estimate equivalent horizontal/vertical channels. In step 1340, terminals 200A, 200B estimate the equivalent horizontal/vertical channels using the horizontal/vertical codebooks. In step 1342, the terminals 200A, 200B feed back the equivalent horizontal/vertical CSI (channel state information) to the base station 100.

In step 1344, the base station 100 determines a precoding scheme and a total precoding matrix based on the received equivalent horizontal/vertical CSI. The processing of steps 1346, 1348, 1350 is the same as that of steps 412,414,416 in FIG. 4 and will not be repeated here. In addition, the specific implementation of the above steps has been described in detail with reference to FIG. 4, so it will not be repeated here.

FIG. 13C is a schematic diagram showing a process flow 1360 of a communication system according to some embodiments of the present disclosure. In FIG. 13C, the terminals 200A, 200B determine whether a non-linear precoding scheme is required.

In FIG. 13C, the processing of steps 1362~1382, 1388, 1390 is the same as that of steps 1322~1342, 1348, 1350 in FIG. 13B, and will not be repeated here.

However, in step 1384, terminals 200A, 200B determine whether the non-linear precoding is required at the base station 100 based on the equivalent horizontal/vertical channels estimated in step 1380. For example, terminals 200A, 200B detect SINRs or RSRPs based on the received pre-processed horizontal/vertical CSI-RSs. When the SINRs or RSRPs are low (for example, below a certain threshold), the terminals 200A, 200B transmit third indication signals to the base station 100 to indicate that the non-linear precoding is required at the base station 100. In step 1386 the base station 100 determines that the non-linear precoding is required in response to the receipt of the third indication signals and determines the precoding parameter for the non-linear precoding. The specific implementation of the above steps has been described in detail with reference to FIG. 13A, and it will not be repeated here.

3. SIMULATION RESULTS

Consider two single-cell outdoor multi-user scenarios, scenario 1 is realted to weakly correlated channels (for example, the users are far away) and scenario 2 is related to strongly correlated channels (for example, the users are close). The basic simulation parameters are as follows:

TABLE 1

Basic Simulation Parameters

| | |
|---|---|
| TRP Antenna Array size | 8 × 8 |
| Number of Terminals | 2 |
| TRP Height | 50 m |
| Number of Multipaths | P = 6 |
| Vertical Angle Expansion | $\delta_e = 5°$ |
| Horizontal Angle Expansion | $\delta_a = 30°$ |
| Distance between User and TRP | [50, 100] m, [60, 65] m |
| Horizontal Transmission Angle Range | [−60°, 60°], [−5°, 5°] |

By selecting different $\varphi_e$ and $\varphi_a$, different precoding algorithms (linear precoding or non-linear precoding) can be realized. As shown in Table 2, if $\varphi_e$ is selected as pseudo-inverse operation or QR decomposition, $\varphi_a$ is selected as pseudo-inverse operation, then ZF precoding is finally realized, and if $\varphi_a$ is selected as QR decomposition, and pre-interference cancellation and modulo operations are carried out on the transmitting signal, then THP precoding is finally realized.

TABLE 2

Comparison of Different Scheme Options

| | Operation | | | |
|---|---|---|---|---|
| | Scheme 1 | Scheme 2 | Scheme 3 | Scheme 4 |
| $\varphi_e$ | Pseudo Inverse | QR Decomposition | Pseudo Inverse | QR Decomposition |
| $\varphi_a$ | Pseudo Inverse | Pseudo Inverse | QR Decomposition | QR Decomposition |
| Whether to perform modulo operations on transmitting signal | No | No | Yes | Yes |

Figure 14A:
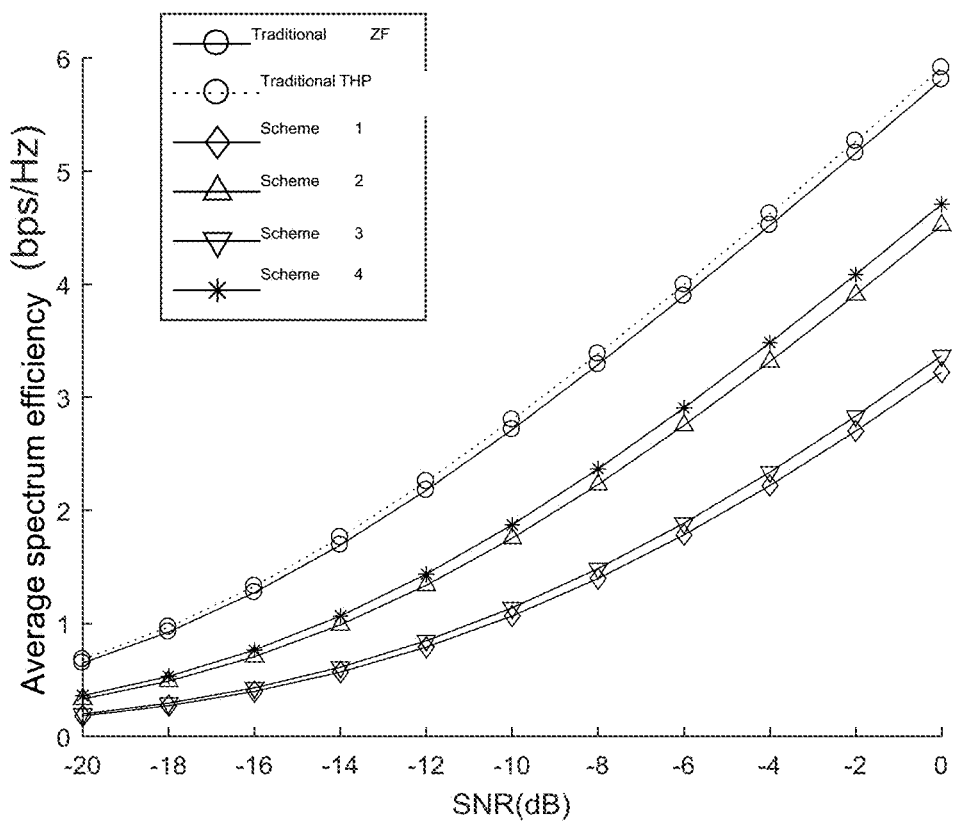
FIG. 14A is a simulation result showing the average spectral efficiency of different schemes in scenario 1.
Figure 14B:
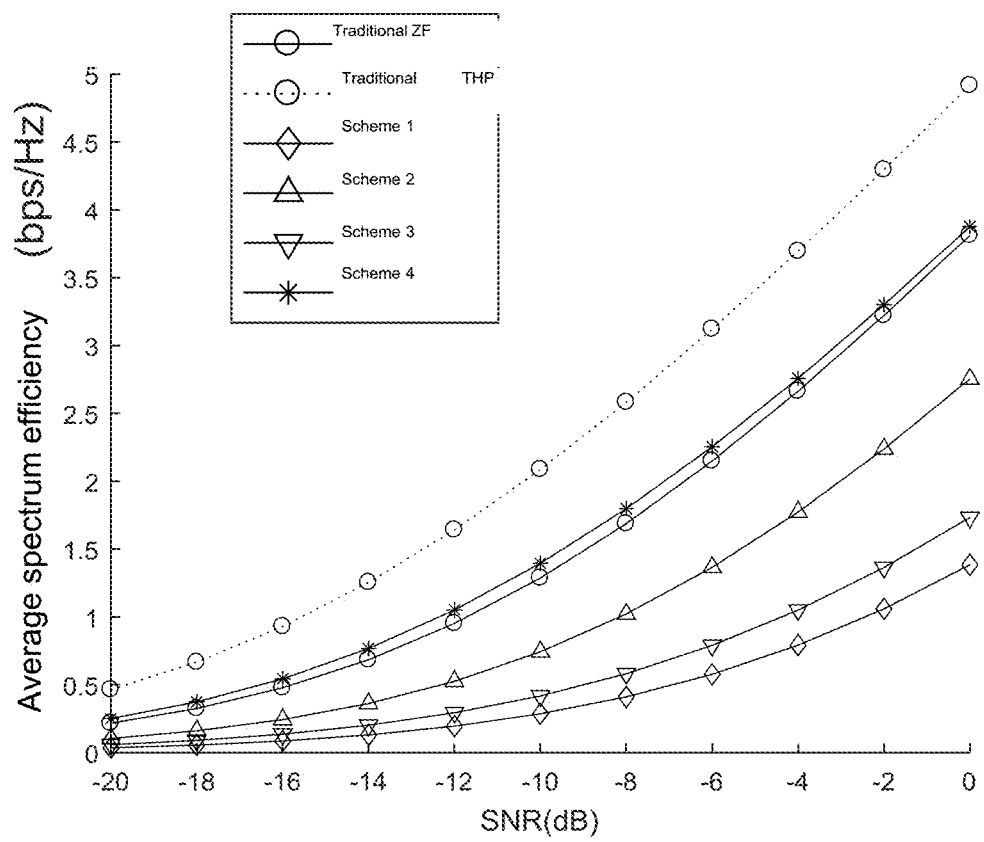
FIG. 14B is a simulation result showing the average spectral efficiency of different schemes in scenario 2.

FIG. 14A is simulation results showing the average spectral efficiency of different schemes in scenario 1. FIG. 14B is simulation results showing the average spectral efficiency of different schemes in scenario 2. It is assumed that the base station 100 has obtained the complete CSI information. Traditional ZF and traditional THP refer to the direct application of ZF and THP, without KP decomposition, so the precoding needs to operate on the large matrix of $K \times M_y M_x$ dimension, which has high computational complexity. Some embodiments of the present disclosure decompose the large matrix of the $K \times M_y M_x$ dimension into two small matrices $K \times M_y$ and $K \times M_x$ for processing based on KP decomposition, so the computational complexity is low.

It can be seen that in the weakly correlated channels of scenario 1 in FIG. 14A, the performances of traditional ZF and traditional THP are higher than the average spectral efficiencies of schemes 1-4. In schemes 1-4, the average spectrum efficiency of scheme 4 is the highest. Under the strongly correlated channel of scenario 2 in FIG. 14B, the average spectral efficiency of the traditional THP is still the highest, but the average spectral efficiency of scheme 4 is higher than that of the traditional ZF method.

4. APPLICATION EXAMPLES

The technology of the present disclosure can be applied to various products. For example, the base station 100 and the terminal 200 may be implemented as various types of computing devices.

For example, the base station 100 may be implemented as any type of evolutionary node B (eNB), gNB or TRP (Transmit Receive Point), such as macro eNB/gNB and small eNB/gNB. A small eNB/gNB may be an eNB/gNB covering a cell smaller than a macro cell, such as pico eNB/gNB, micro eNB/gNB, and home (femto) eNB/gNB. Alternatively, the base station 100 may be implemented as any other types of base station, such as a NodeB and a base transceiver station (BTS). The base station 100 may include a main body (also known as a base station device) configured to control wireless communication; and one or more remote radio heads (RRH) arranged in a place different from the main body. In addition, the various types of terminals described below may operate as the base stations 100 by temporarily or semi-persistently performing functions of the base station.

For example, the terminal 200 may be implemented as a mobile terminal (such as a smart phone, a tablet personal computer (PC), a notebook PC, a portable game terminal, a portable/encrypted dog mobile router and a digital camera device) or a vehicle terminal (such as a car navigation device). The terminal device 300 may also be implemented as a terminal that performs machine-to-machine (M2M) communication (also known as a machine type communication (MTC) terminal). In addition, the terminal 200 may be a wireless communication module installed on each terminal of the above-mentioned terminals (such as an integrated circuit module including a single chip).

[4-1. Application Examples of Computing Device]

Figure 15:
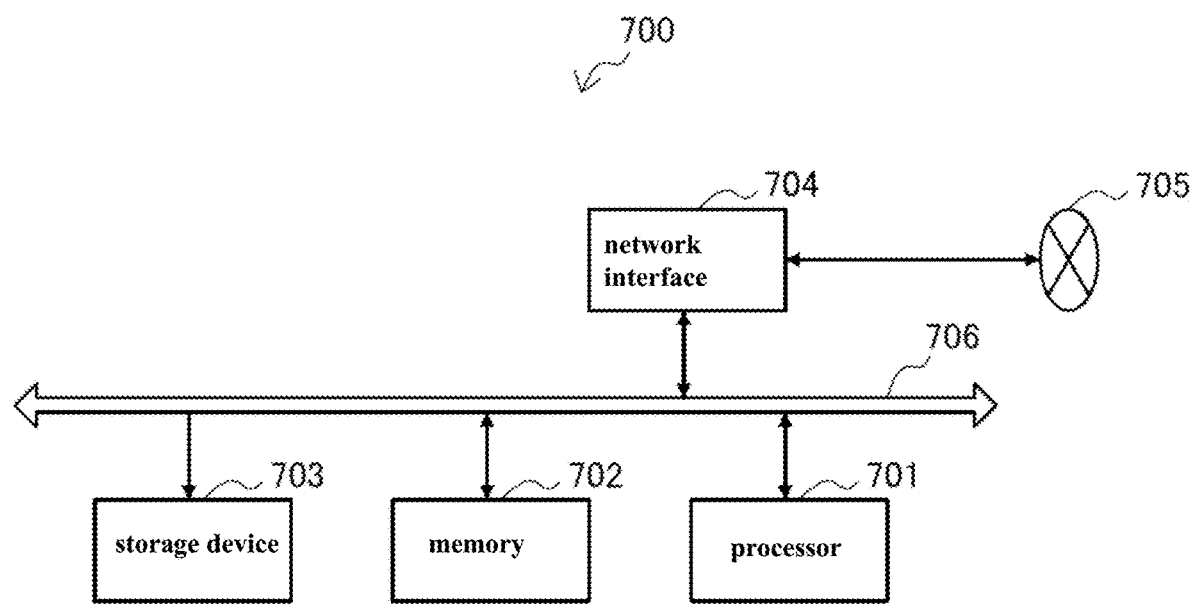
FIG. 15 is a block diagram showing an example of a schematic configuration of a computing device to which the techniques of the present disclosure may be applied.

FIG. 15 is a block diagram showing an example of a schematic configuration of a computing device 700 to which the technology of the present disclosure may be applied. The computing device 700 includes a processor 701, a memory 702, a storage device 703, a network interface 704, and a bus 706.

The processor 701 may be, for example, the central processing unit (CPU) or the digital signal processor (DSP), and control the functions of the server 700. The memory 702 includes a random access memory (RAM) and a read-only memory (ROM), and stores data and programs executed by the processor 701. The storage device 703 may include a storage medium such as a semiconductor memory and a hard disk.

The network interface 704 is a wired communication interface for connecting the server 700 to the wired communication network 705. The wired communication network 705 may be a core network such as an evolved packet core network (EPC) or a packet data network (PDN) such as the Internet.

Bus 706 connects the processor 701, the memory 702, the storage device 703 and the network interface 704 to each other. Bus 706 may include two or more buses each having a different speed (such as a high-speed bus and a low-speed bus).

[4-2. Application Examples of Base Station]

First Application Example

Figure 16:
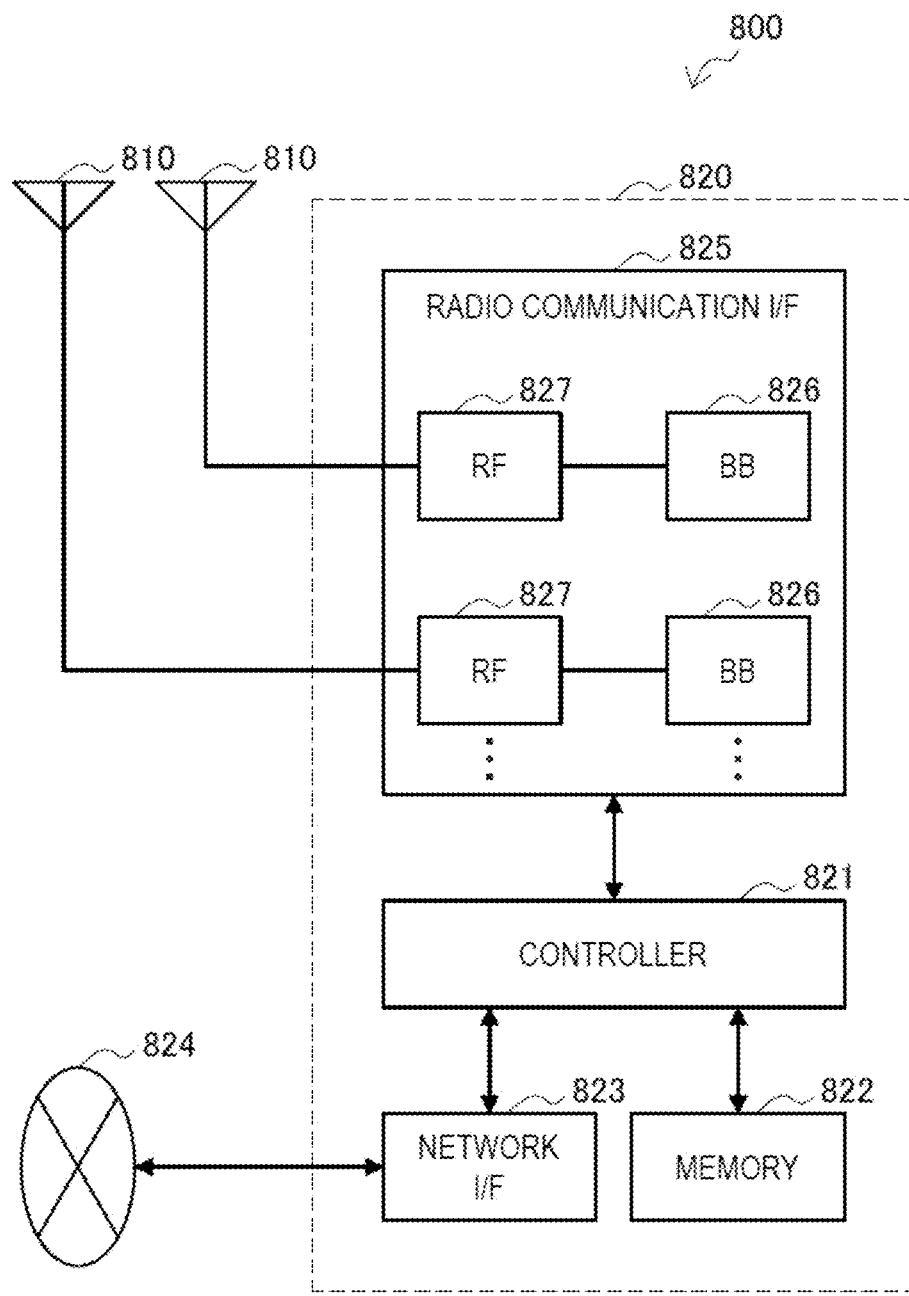
FIG. 16 is a block diagram showing a first example of a schematic configuration of an eNB to which the techniques of the present disclosure may be applied.

FIG. 16 is a block diagram illustrating a first example of a schematic configuration of an eNB to which a technology of the present application may be applied. The eNB 800 includes a plurality of antennas 810 and a base station device 820. The base station device 820 and each antenna 810 may be connected with each other via a RF cable.

The antennas 810 each may include a single or multiple antenna elements (such as multiple antenna elements included in a Multiple Input and Multiple Output (MIMO) antennas), and is used for the base station 820 to transmit and receive radio signals. The eNB 800 may include multiple antennas 810, as illustrated in FIG. 16. For example, the multiple antennas 810 may be compatible with multiple frequency bands used by the eNB 800. Although FIG. 16 shows an example in which the eNB 800 includes a plurality of antennas, the eNB 800 may also include a single antenna 810.

The base station device 820 includes a controller 821, a memory 822, a network interface 823, and a radio communication interface 825.

The controller 821 may be, for example, a CPU or a DSP, and operates various functions of a higher layer of the base station device 820. For example, the controller 821 generates a data packet from data in signals processed by the radio communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control, and scheduling. The control may be performed in corporation with an eNB or a core network node in the vicinity. The memory 822 includes RAM and ROM, and stores a program that is executed by the controller 821, and various types of control data such as a terminal list, transmission power data, and scheduling data.

The network interface 823 is a communication interface for connecting the base station device 820 to a core network 824. The controller 821 may communicate with a core network node or another eNB via the network interface 823. In that case, the eNB 800, and the core network node or the other eNB may be connected to each other through a logical interface such as an S1 interface and an X2 interface. The network interface 823 may also be a wired communication interface or a radio communication interface for radio backhaul. If the network interface 823 is a radio communication interface, the network interface 823 may use a higher frequency band for radio communication than a frequency band used by the radio communication interface 825.

The radio communication interface 825 supports any cellular communication scheme such as Long Term Evolution (LTE) and LTE-Advanced, and provides radio connection to a terminal positioned in a cell of the eNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers such as L1, medium access control (MAC), radio link control (RLC), and a packet data convergence protocol (PDCP). The BB processor 826 may have a part or all of the above-described logical functions instead of the controller 821. The BB processor 826 may be a memory that stores a communication control program, or a module that includes a processor configured to execute the program and a related circuit. Updating the program may allow the functions of the BB processor 826 to be changed. The module may be a card or a blade that is inserted into a slot of the base station device 820. Alternatively, the module may also be a chip that is mounted on the card or the blade. Meanwhile, the RF circuit 827 may include, for example, a mixer, a filter, and an amplifier, and transmits and receives radio signals via the antenna 810.

The radio communication interface 825 may include the multiple BB processors 826, as illustrated in FIG. 16. For example, the multiple BB processors 826 may be compatible with multiple frequency bands used by the eNB 800. The radio communication interface 825 may include the multiple RF circuits 827, as illustrated in FIG. 16. For example, the multiple RF circuits 827 may be compatible with multiple antenna elements. Although FIG. 16 illustrates the example in which the radio communication interface 825 includes the multiple BB processors 826 and the multiple RF circuits 827, the radio communication interface 825 may also include a single BB processor 826 or a single RF circuit 827.

Second Application Example

Figure 17:
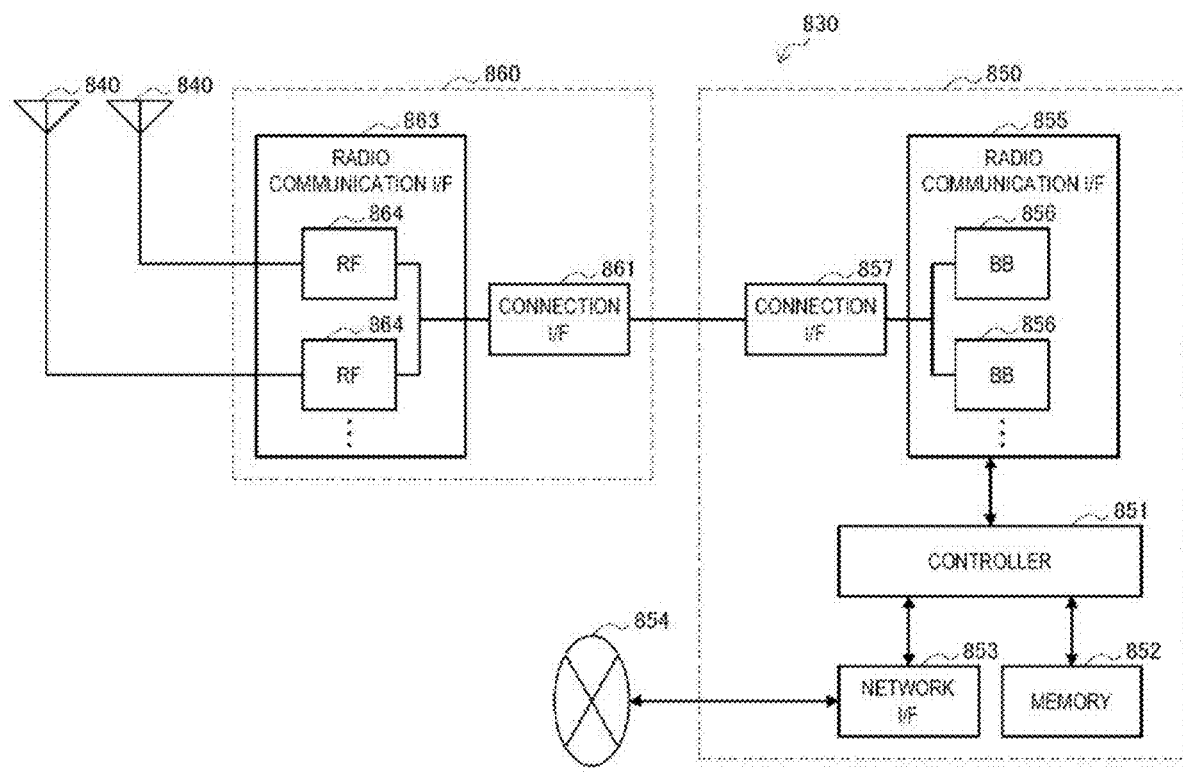
FIG. 17 is a block diagram showing a second example of a schematic configuration of an eNB to which the techniques of the present disclosure may be applied.

FIG. 17 is a block diagram illustrating a second example of a schematic configuration of an eNB to which a technology of the present application may be applied. The eNB 830 includes one or more antennas 840, a base station device 850, and an RRH 860. Each antenna 840 and the RRH 860 may be connected to each other via an RF cable. The base station device 850 and the RRH 860 may be connected to each other via a high-speed line such as an optical fiber cable.

The antennas 840 each includes a signal or multiple antenna elements such as multiple antenna elements included in an MIMO antenna and is used for the RRH 860 to transmit and receive radio signals. The eNB 830 may include multiple antennas 840, as illustrated in FIG. 17. For example, multiple antennas 840 may be compatible with multiple frequency bands used by the eNB 830. Although FIG. 17 shows an example in which the eNB 830 includes a plurality of antennas 840, the eNB 830 may also include a single antenna 840.

The base station device 850 includes a controller 851, a memory 852, a network interface 853, a radio communication interface 855, and a connection interface 857. The network interface 853 is a communication interface for connecting the base station device 850 to a core network 854. The controller 851, the memory 852, the network interface 853, and the core network 854 are the same as the controller 821, the memory 822, the network interface 823, and the core network 824 described with reference to FIG. 16.

The radio communication interface 855 supports any cellular communication scheme such as LTE and LTE-Advanced, and provides radio communication to a terminal positioned in a sector corresponding to the RRH 860 via the RRH 860 and the antenna 840. The radio communication interface 855 may typically include, for example, a BB processor 856. The BB processor 856 is the same as the BB processor 826 described with reference to FIG. 16, except the BB processor 856 is connected to the RF circuit 864 of the RRH 860 via the connection interface 857. The radio communication interface 855 may include the multiple BB processors 856, as illustrated in FIG. 17. For example, multiple BB processors 856 may be compatible with multiple frequency bands used by the eNB 830. Although FIG. 17 illustrates the example in which the radio communication interface 855 includes multiple BB processors 856, the radio communication interface 855 may also include a single BB processor 856.

The connection interface 857 is an interface for connecting the base station device 850 (radio communication interface 855) to the RRH 860. The connection interface 857 may also be a communication module for communication in the above-described high-speed line that connects the base station device 850 (radio communication interface 855) to the RRH 860.

The RRH 860 includes a connection interface 861 and a radio communication interface 863.

The connection interface 861 is an interface for connecting the RRH 860 (radio communication interface 863) to the base station device 850. The connection interface 861 may also be a communication module for communication in the above-described high-speed line.

The radio communication interface 863 transmits and receives radio signals via the antenna 840. The radio communication interface 863 may typically include, for example, the RF circuit 864. The RF circuit 864 may include, for example, a mixer, a filter, and an amplifier, and transmits and receives radio signals via the antenna 840. The radio communication interface 863 may include multiple RF circuits 864, as illustrated in FIG. 17. For example, multiple RF circuits 864 may support multiple antenna elements. Although FIG. 17 illustrates the example in which the radio communication interface 863 includes the multiple RF circuits 864, the radio communication interface 863 may also include a single RF circuit 864.

[4-3. Application Examples of User Device]

First Application Example

Figure 18:
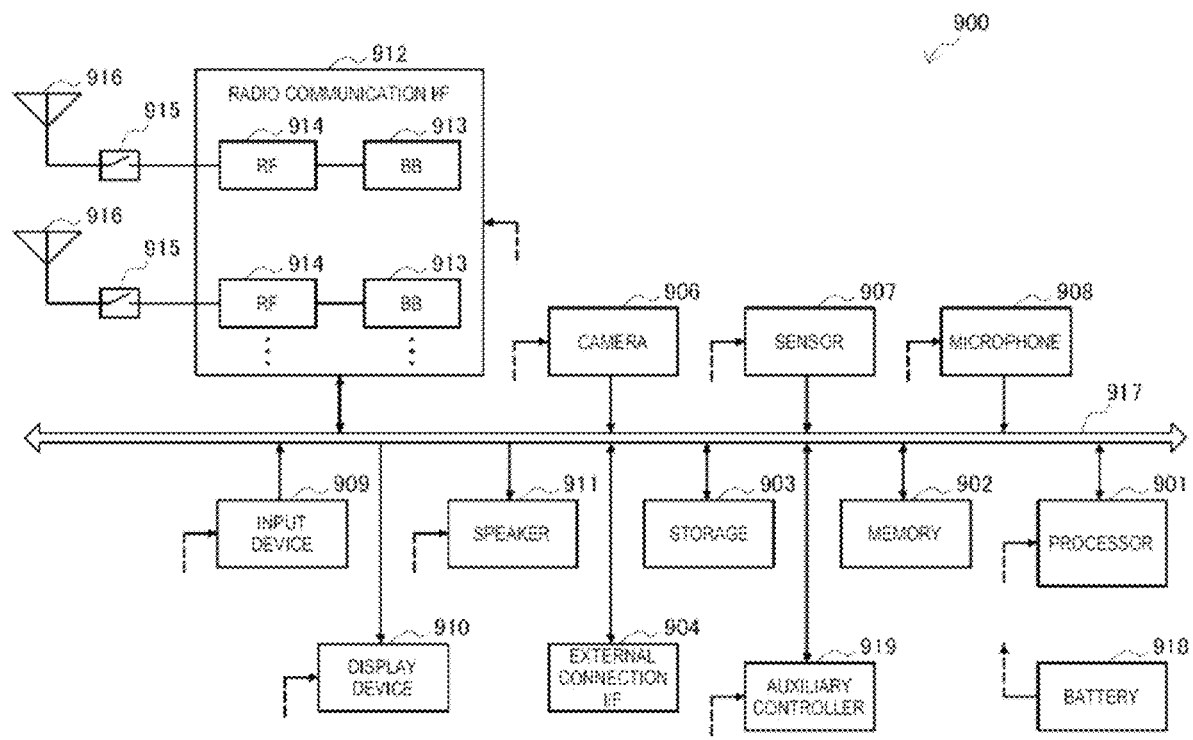
FIG. 18 is a block diagram showing an example of a schematic configuration of a smart phone to which the techniques of the present disclosure can be applied.

FIG. 18 is a block diagram illustrating an example of a schematic configuration of a smartphone 900 to which a technology of the present application may be applied. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and the other layers of the smartphone 900. The memory 902 includes RAM and ROM, and stores data and program that is executed by the processor 901. The storage 903 may include a storage medium such as a semiconductor memory and a hard disk. The external connection interface 904 is an interface for connecting an external device such as a memory card and a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts the sounds that are input to the smartphone 900 to audio signals. The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The radio communication interface 912 supports any cellular communication scheme such as LTE and LTE-Advanced, and performs radio communication. The radio communication interface 912 may typically include, for example, a BB processor 913 and an RF circuit 914. The BB processor 913 may perform, for example, encoding/decoding, modulating/demodulating, and multiplexing/demultiplexing, and performs various types of signal processing for radio communication. Meanwhile, the RF circuit 914 may include, for example, a mixer, a filter, and an amplifier, and transmits and receives radio signals via the antenna 916. The radio communication interface 912 may also be a one chip module that integrates the BB processor 913 and the RF circuit 914 thereon. The radio communication interface 912 may include multiple BB processors 913 and multiple RF circuits 914, as illustrated in FIG. 18. Although FIG. 18 illustrates the example in which the radio communication interface 912 includes multiple BB processors 913 and multiple RF circuits 914, the radio communication interface 912 may also include a single BB processor 913 or a single RF circuit 914.

Furthermore, in addition to a cellular communication scheme, the radio communication interface 912 may support another type of radio communication scheme such as a short-distance wireless communication scheme, a near field communication scheme, and a wireless local area network (LAN) scheme. In that case, the radio communication interface 912 may include the BB processor 913 and the RF circuit 914 for each radio communication scheme.

Each of the antenna switches 915 switches connection destinations of the antennas 916 among multiple circuits (such as circuits for different radio communication schemes) included in the radio communication interface 912.

The antennas 916 may include multiple antenna elements such as multiple antenna elements included in a MIMO antenna, and is used for the radio communication interface 912 to transmit and receive radio signals. The smartphone 900 may include multiple antennas 916, as illustrated in FIG. 18. Although FIG. 18 illustrates the example in which the smartphone 900 includes multiple antennas 916, the smartphone 900 may also include a single antenna 916.

Furthermore, the smartphone 900 may include the antenna 916 for each radio communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to blocks of the smartphone 900 illustrated in FIG. 18 via feeder lines, which are partially shown as dashed lines in the figure. The auxiliary controller 919 operates a minimum necessary function of the smartphone 900, for example, in a sleep mode.

Second Application Example

Figure 19:
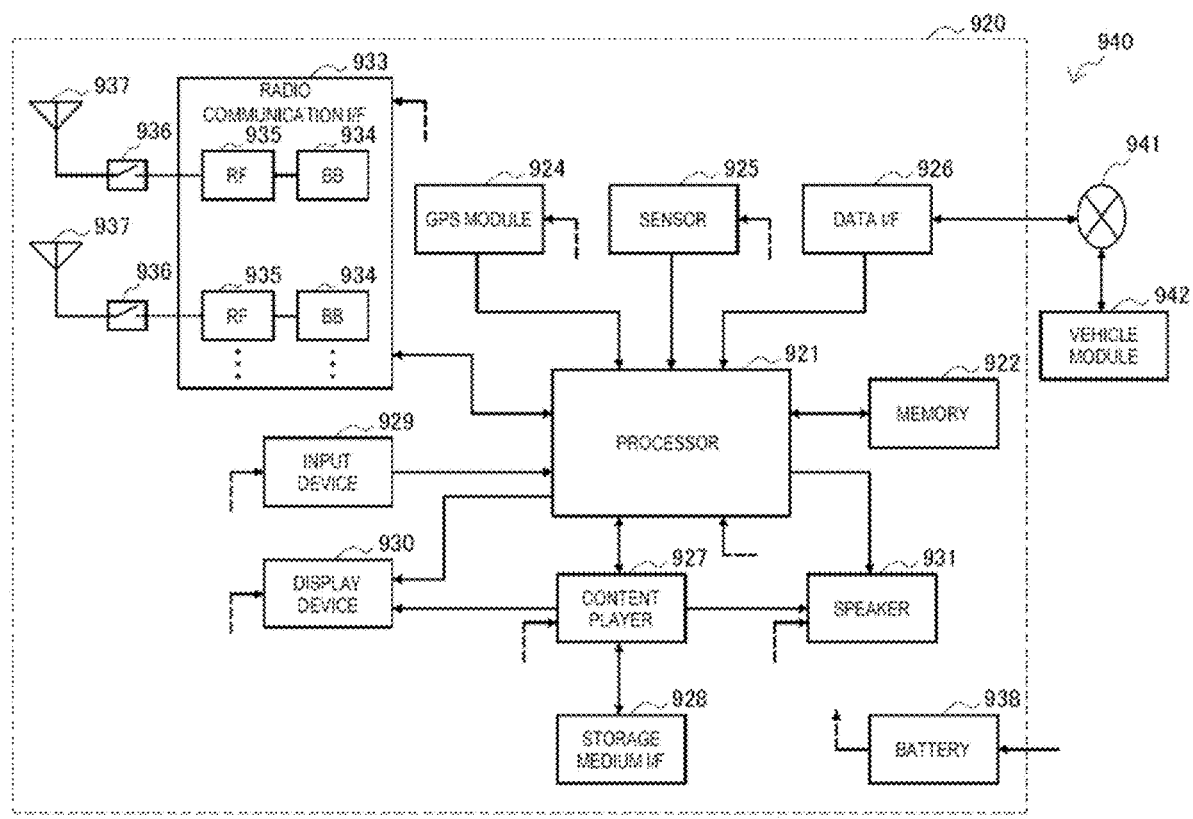
FIG. 19 is a block diagram showing an example of a schematic configuration of a vehicle navigation device to which the techniques of the present disclosure may be applied.

FIG. 19 is a block diagram illustrating an example of a schematic configuration of a car navigation device 920 to which an embodiment of the technology of the present application may be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example, a CPU or a SoC, and controls a navigation function and other functions of the car navigation device 920. The memory 922 includes RAM and ROM, and stores data and program that is executed by the processor 921.

The GPS module 924 uses GPS signals received from a GPS satellite to measure a position, such as latitude, longitude, and altitude, of the car navigation device 920. The sensor 925 may include a group of sensors such as a gyro sensor, a geomagnetic sensor, and an air pressure sensor. The data interface 926 is connected to, for example, an in-vehicle network 941 via a terminal that is not shown, and acquires data generated by the vehicle, such as vehicle speed data.

The content player 927 reproduces content stored in a storage medium, such as a CD and a DVD, that is inserted into the storage medium interface 928. The input device 929 includes, for example, a touch sensor configured to detect touch onto a screen of the display device 930, a button, or a switch, and receives an operation or an information input from a user. The display device 930 includes a screen such as an LCD or an OLED display, and displays an image of the navigation function or content that is reproduced. The speaker 931 outputs sound of the navigation function or the content that is reproduced.

The radio communication interface 933 supports any cellular communication scheme, such as LTE and LTE-Advanced, and performs radio communication. The radio communication interface 933 may typically include, for example, a BB processor 934 and an RF circuit 935. The BB processor 934 may perform, for example, encoding/decoding, modulating/demodulating, and multiplexing/demultiplexing, and performs various types of signal processing for radio communication. Meanwhile, the RF circuit 935 may include, for example, a mixer, a filter, and an amplifier, and transmits and receives radio signals via the antenna 937. The radio communication interface 933 may be a one chip module which integrates the BB processor 934 and the RF circuit 935 thereon. The radio communication interface 933 may include multiple BB processors 934 and multiple RF circuits 935, as illustrated in FIG. 19. Although FIG. 19 illustrates the example in which the radio communication interface 933 includes multiple BB processors 934 and multiple RF circuits 935, the radio communication interface 933 may also include a single BB processor 934 or a single RF circuit 935.

Furthermore, in addition to a cellular communication scheme, the radio communication interface 933 may support another type of radio communication scheme such as a short-distance wireless communication scheme, a near field communication scheme, and a wireless LAN scheme. In that case, the radio communication interface 933 may include the BB processor 934 and the RF circuit 935 for each radio communication scheme.

Each of the antenna switches 936 switches connection destinations of the antennas 937 among multiple circuits (such as circuits for different radio communication schemes) included in the radio communication interface 933.

The antennas 937 may include multiple antenna elements, such as multiple antenna elements included in a MIMO antenna, and is used for the radio communication interface 933 to transmit and receive radio signals. The car navigation device 920 may include the multiple antennas 937, as illustrated in FIG. 19. Although FIG. 19 illustrates the example in which the car navigation device 920 includes multiple antennas 937, the car navigation device 920 may also include a single antenna 937.

Furthermore, the car navigation device 920 may include the antenna 937 for each radio communication scheme. In that case, the antenna switches 936 may be omitted from the configuration of the car navigation device 920.

The battery 938 supplies power to blocks of the car navigation device 920 illustrated in FIG. 19 via feed lines that are partially shown as dashed lines in the figure. The battery 938 accumulates power supplied from the vehicle.

Technology of the present application may also be realized as an in-vehicle system (or a vehicle) 940 including one or more blocks of the car navigation device 920, the in-vehicle network 941, and a vehicle module 942. The vehicle module 942 generates vehicle data such as vehicle speed, engine speed, and trouble information, and outputs the generated data to the in-vehicle network 941.

Various schematic blocks and components described in the present disclosure may be implemented or executed with general-purpose processors, digital signal processors (DSP), ASIC, FPGA or other programmable logic devices, discrete gate or transistor logic, discrete hardware components or any combination of them designed to perform the functions described herein. The general-purpose processor may be a microprocessor, but alternatively, the processor may be any conventional processor, controller, microcontroller and/or state machine. Processors may also be implemented as combinations of computing devices, such as DSP and microprocessors, multiple microprocessors, one or more microprocessors combined with DSP cores, and/or any other such configuration.

The functions described herein can be implemented in hardware, software executed by the processor, firmware, or any combination of them. If implemented in software executed by the processor, the function may be stored on a non-transient computer-readable medium or transmitted as one or more instructions or codes on a non-transient computer-readable medium. Other examples and implementations are within the scope and spirit of the present disclosure and the accompanying claims. For example, given the nature of the software, the functions described above may be performed using software, hardware, firmware, hard wiring, or any combination of these performed by the processor. Features that implement the function can also be physically placed in various locations, including being distributed so that parts of the function are implemented in different physical locations.

In addition, the disclosure of components contained in or separated from other components should be considered exemplary because a variety of other architectures can potentially be implemented to achieve the same function, including the integration of all, most, and/or some components as part of one or more single or separate structures.

The non-transient computer-readable medium may be any available non-transient medium that can be accessed by a general-purpose computer or a dedicated computer. For example, without limitation, non-transient computer-readable media may include RAM, ROM, EEPROM, flash memory, CD-ROM, DVD or other optical disc storage, disk storage or other magnetic storage devices, or desired program code components that can be used to carry or store instructions or data structures and any other media that can be accessed by general-purpose or dedicated computers or general-purpose or dedicated processors.

The previous descriptions of the present disclosure are provided to enable those skilled in the art to produce or use the present disclosure. The various modifications to the present disclosure are obvious to those skilled in the art, and the general principles defined herein can be applied to other variants without departing from the scope of this disclosure. Therefore, the present disclosure is not limited to the examples and designs described herein, but corresponds to the widest range consistent with the disclosed principles and new features.

Some embodiments of the present disclosure may also be configured as follows:

1. An electronic device operating on a base station side, the electronic device comprising:
a processing circuit configured to perform control to cause the electronic device to:
estimate channel correlation in a first direction among a plurality of terminals communicating with the base station; and
in response to that the estimated channel correlation in the first direction among the plurality of terminals satisfies a predetermined condition,
transmit a first indication signal to indicate that a second measurement process is to be performed to determine channel information in a second direction after a first measurement process is to be performed to determine channel information in the first direction, and
transmit, based on the channel information in the second direction, a second indication signal to indicate a precoding scheme for data to be transmitted from the base station to the plurality of terminals, the precoding scheme including linear precoding or non-linear precoding.

2. The electronic device of item 1, wherein the channel correlation is estimated based on first reference signals received by the base station from the plurality of terminals.

3. The electronic device of items 1-2 (especially item 1), wherein the predetermined condition includes that the channel correlation among the plurality of terminals in the first direction is higher than a first correlation threshold.

4. The electronic device of items 1-3 (especially item 1), wherein the processing circuit is also configured to perform control to cause the electronic device to:
estimate channel correlation in the second direction among the plurality of terminals, wherein the predetermined condition includes that the channel correlation in the first direction among the plurality of terminals is higher than the channel correlation in the second direction among the plurality of terminals,
in response to that the channel correlation in the first direction among the plurality of terminals does not satisfy the predetermined condition,
transmit the first indication signal to indicate that the first measurement process is to be performed to determine the channel information in the first direction after the second measurement process is to be performed to determine the channel information in the second direction, and
transmit the second indication signal based on the channel information in the first direction.

5. The electronic device of items 1-4 (especially item 1), wherein the processing circuit is also configured to perform control to cause the electronic device to:
determine, based on respective channel information in the first direction fed back by the plurality of terminals, a common precoding parameter in the first direction for the plurality of terminals;
determine, based on respective channel information in the second direction fed back by the plurality of terminals, respective precoding parameters in the second direction for the plurality of terminals; and
determine, based on a Kronecker product of the common precoding parameter in the first direction and the precoding parameter in the second direction, a precoding parameter for the data to be transmitted to the plurality of terminals.

6. The electronic device of items 1-5 (especially item 5), wherein determining the common precoding parameter in the first direction for the plurality of terminals includes:
generating, based on the respective channel information in the first direction fed back by the plurality of terminals, the respective precoding parameter in the first direction for the plurality of terminals; and
taking a constant multiple of a weighted average of the respective precoding parameters in the first direction for the plurality of terminals as the common precoding parameter.

7. The electronic device of items 1-6 (especially item 5), wherein the processing circuit is also configured to perform control to cause the electronic device to:
transmit, in the second measurement process, a third reference signal which is linearly preprocessed with the common precoding parameter to the plurality of terminals, wherein the respective channel information in the second direction of the plurality of terminals is determined by the plurality of terminals based on the third reference signal received from the base station which is linearly preprocessed with the common precoding parameter.

8. The electronic device of items 1-7 (especially item 1), wherein the processing circuit is also configured to perform control to cause the electronic device:

determine, based on the channel information in the second direction, a demodulation parameter for non-linear demodulation at sides of the plurality of terminal; and transmit the second indication signal including the demodulation parameter to the plurality of terminals.

9. The electronic device of items 1-8 (especially item 1), wherein the processing circuit is also configured to perform control to cause the electronic device:

transmit, from the base station to the plurality of terminals, a demodulation reference signal which is not non-linearly precoded for determining a demodulation parameter, wherein the demodulation reference signal includes K orthogonal sequences, where K is a number of the plurality of terminals.

10. The electronic device of items 1-9 (especially item 1), wherein the processing circuit is also configured to perform control to cause the electronic device to:

transmit, the second reference signal from the base station to the plurality of terminals at a first interval during the first measurement process; and transmit, the third reference signal from the base station to the plurality of terminals at a second interval during the second measurement process, wherein the second interval is shorter than the first interval.

11. The electronic device of items 1-10 (especially item 1), wherein the processing circuit is also configured to perform control to cause the electronic device to:

estimate, based on respective channel information in the second direction fed back by the plurality of terminals in the second measurement process, equivalent channel correlation in the second direction among the plurality of terminals; and transmit, in response to that the estimated equivalent channel correlation in the second direction among the plurality of terminals is higher than a second correlation threshold, the second indication signal to indicate that the precoding scheme for the data to be transmitted from the base station to the plurality of terminals is non-linear precoding, and/or transmit, in response to that the estimated equivalent channel correlation in the second direction among the plurality of terminals is lower than the second correlation threshold, the second indication signal to indicate that the precoding scheme for the data to be transmitted from the base station to the plurality of terminals is linear precoding.

12. The electronic device of any of items 1-11, wherein the first direction is vertical and the second direction is horizontal.

13. The electronic device of any of items 1-12 (especially items 1-11), wherein the electronic device is implemented as a base station, and the electronic device further includes a plurality of antennas for transmitting data signals precoded using the precoding scheme to the plurality of terminals on the same transmission resources.

14. An electronic device of any of items 1-13 (especially items 1-11), wherein the precoding scheme is a baseband digital precoding scheme, and the processing circuit further includes a digital precoder configured to adjust amplitude and phase of a baseband data signal for each terminal according to the precoding scheme.

15. An electronic device operating on a terminal side, comprising:

a processing circuit configured to perform control to cause the electronic device to:

transmit a first reference signal to a base station for the base station to estimate channel correlation in the first direction between the terminal and other terminals;

determine, in response to receiving a first indication signal, that a second measurement process is to be performed after a first measurement process is to be performed, wherein the electronic device performs a first measurement and feeds back the channel information in the first direction during the first measurement process, and the electronic device performs a second measurement and feeds back the channel information in the second direction during the second measurement process; and demodulate, in response to receiving a second indication signal, data transmitted from the base station according to a precoding scheme indicated in the second indication signal, the precoding scheme including linear precoding or non-linear precoding, wherein the first indication signal is transmitted by the base station in response to determining that the channel correlation in the first direction between the terminal and other terminals satisfies a predetermined condition, and the second indication signal is transmitted by the base station based on the channel information in the second direction fed back by the terminal.

16. The electronic device of item 15, wherein the processing circuit is also configured to perform control to cause the electronic device to:

receive, after receiving the first indication signal, a second reference signal transmitted by the base station in the first direction first to perform the first measurement; and select, a precoding matrix matching a result of the first measurement from a channel codebook in the first direction, and include an indicator of the precoding matrix in the channel information in the first direction as fed back.

17. The electronic device of items 15-16 (especially item 15), wherein the processing circuit is also configured to perform control to cause the electronic device to:

transmit, during the first measurement process, the channel information in the first direction to the base station, which is used to determine a common precoding parameter in the first direction for downlink data of the terminal and the other terminals; and transmit, during the second measurement process, the channel information in the second direction to the base station, which is used to determine respective precoding parameters in the second direction for downlink data of the terminal and the other terminals;

wherein the Kronecker product of the common precoding parameter in the first direction and the precoding parameters in the second direction is used to determine a precoding parameter of the precoding scheme.

18. The electronic device of items 15-17 (especially item 17), wherein the processing circuit is also configured to perform control to cause the electronic device to, during the second measurement process:

receive, a third reference signal which is linearly preprocessed with the common precoding parameter from the base station; and determine, based on the third reference signal received from the base station which is linearly preprocessed with the common precoding parameter, the channel information in the second direction.

19. The electronic device of items 15-18 (especially item 15), wherein the processing circuit is also configured to perform control to cause the electronic device to:

receive, a demodulation parameter for non-linear demodulation from the base station, wherein the demodulation parameter is determined by the base station based on the channel information in the second direction.

20. The electronic device of items 15-19 (especially item 15), wherein the processing circuit is also configured to perform control to cause the electronic device to:

receive, a demodulation reference signal which is not non-linearly precoded from the base station to determine a demodulation parameter for non-linear demodulation, wherein the demodulation reference signal includes K orthogonal sequences, where K is a number of the plurality of terminals.

21. The electronic device of items 15-20 (especially item 15), wherein the processing circuit is also configured to perform control to cause the electronic device to:

receive, a second reference signal transmitted from the base station at a first interval during the first measurement process; and receive, a third reference signal transmitted from the base station at a second interval during the second measurement process, wherein the second interval is shorter than the first interval.

22. The electronic equipment of any of items 15-21, wherein the first direction is vertical and the second direction is horizontal.

23. The electronic device of any of items 15-22 (especially items 15-21), wherein the electronic device is implemented as a terminal, and the electronic device further includes antennas for receiving data signals precoded using the precoding scheme and transmitted by the base station to a plurality of terminals including the terminal on the same transmission resources, and the processing circuit is further configured to perform control to cause the electronic device to:

perform modulo operations on the received data signals for data demodulation, in response to that the second indication signal indicates that the precoding scheme is non-linear precoding scheme.

24. An electronic device operating on a base station side, the electronic device comprising:

a processing circuit configured to perform control to cause the electronic device to:

estimate channel correlation in a first direction among a plurality of terminals communicating with the base station;

in response to that the estimated channel correlation in the first direction among the plurality of terminals satisfies a predetermined condition, determine, based on the respective channel information in the first direction fed back by the plurality of terminals, a common precoding parameter in the first direction for the plurality of terminals;

determine, based on the respective channel information in the second direction fed back by the plurality of terminals, respective precoding parameters in the second direction for the plurality of terminals; and determine, based on the Kronecker product of the common precoding parameter in the first direction and the precoding parameters in the second direction, a precoding parameter for non-linear precoding of data to be transmitted from the base station to the plurality of terminals.

25. The electronic device of item 24, wherein the channel correlation is estimated based on first reference signals received by the base station from the plurality of terminals.

26. The electronic device of items 24-25 (especially item 24), wherein determining the common precoding parameter in the first direction for the plurality of terminals includes:

generating, based on the respective channel information in the first direction fed back by the plurality of terminals, respective precoding parameters in the first direction for the plurality of terminals; and taking a constant multiple of a weighted average of the respective precoding parameter in the first direction for the plurality of terminals as the common precoding parameter.

27. The electronic device of items 24-26 (especially item 24), wherein the processing circuit is also configured to perform control to cause the electronic device to:

transmit a third reference signal which is linearly preprocessed with the common precoding parameter to the plurality of terminals, wherein the respective channel information in the second direction of the plurality of terminals is determined by the plurality of terminals based on the third reference signal received from the base station which is linearly preprocessed with the common precoding parameter.

28. The electronic device of items 24-27 (especially item 24), wherein the processing circuit is also configured to perform control to cause the electronic device to:

determine, based on the channel information in the second direction, a demodulation parameter for non-linear demodulation at sides of the plurality of terminal; and transmit a second indication signal including the demodulation parameter to the plurality of terminals.

29. The electronic device of any of items 24-28, wherein the first direction is vertical and the second direction is horizontal.

30. The electronic device of any of items 24-29 (especially items 24-28), wherein the electronic device is implemented as a base station, and the electronic device also includes a plurality of antennas for transmitting data signals precoded with the precoding scheme to the plurality of terminals on the same transmission resources.

31. A communication method performed on a base station side, comprising:

estimating channel correlation in a first direction among a plurality of terminals communicating with the base station; and in response to that the estimated channel correlation in the first direction among the plurality of terminals satisfies a predetermined condition, transmitting a first indication signal to indicate that a second measurement process is to be performed to determine channel information in a second direction after a first measurement process is to be performed to determine channel information in the first direction, and transmitting, based on the channel information in the second direction, a second indication signal to indicate a precoding scheme for data to be transmitted from the base station to the plurality of terminals, the precoding scheme including linear precoding or non-linear precoding.

32. A communication method performed on a terminal side, comprising:

transmitting a first reference signal to a base station for the base station to estimate channel correlation in the first direction between the terminal and other terminals;

determining, in response to receiving a first indication signal, that a second measurement process is to be performed after a first measurement process is to be performed, wherein a first measurement is performed and the channel information in the first direction is fed back during the first measurement process, and a second measurement is performed and the channel information in the second direction is fed back during the second measurement process, and demodulating, in response to receiving a second indication signal, data transmitted from the base station according to a precoding scheme indicated in the second indication signal, the precoding scheme including linear precoding or non-linear precoding, wherein the first indication signal is transmitted by the base station in response to determining that the channel correlation in the first direction between the terminal and other terminals satisfies a predetermined condition, and the second indication signal is transmitted by the base station based on the channel information in the second direction fed back by the terminal.

33. A communication method performed on a base station side, comprising:

estimating channel correlation in a first direction among a plurality of terminals communicating with the base station;

in response to that the estimated channel correlation in the first direction among the plurality of terminals satisfies a predetermined condition, determining, based on respective channel information in the first direction of the plurality of terminals, a common precoding parameter in the first direction for the plurality of terminals;

determining, based on respective channel information in the second direction of the plurality of terminals, respective precoding parameters in the second direction for the plurality of terminals; and determining, based on the Kronecker product of the common precoding parameter in the first direction and the precoding parameter in the second direction, a precoding parameter for non-linear precoding of data to be transmitted from the base station to the plurality of terminals.

34. A non-transient computer-readable storage medium with instructions stored thereon which, when executed by a processor, cause the processor to execute the method of any of items 31 to 33.

What is claimed is:

1. An electronic device operating on a base station side, the electronic device comprising:
a processing circuit configured to perform control to cause the electronic device to:
estimate channel correlation in a first direction among a plurality of terminals communicating with the base station; and
in response to the estimated channel correlation in the first direction among the plurality of terminals satisfying a predetermined condition,
transmit a first indication signal to indicate that a second measurement process is to be performed to determine channel information in a second direction after a first measurement process is to be performed to determine channel information in the first direction, and
transmit, based on the channel information in the second direction, a second indication signal to indicate a precoding scheme for data to be transmitted from the base station to the plurality of terminals, the precoding scheme including linear precoding or non-linear precoding.

2. The electronic device of claim 1, wherein the channel correlation is estimated based on first reference signals received by the base station from the plurality of terminals.

3. The electronic device of claim 1, wherein the predetermined condition includes that the channel correlation among the plurality of terminals in the first direction is higher than a first correlation threshold.

4. The electronic device of claim 1, wherein the processing circuit is further configured to perform control to cause the electronic device to:
estimate channel correlation in the second direction among the plurality of terminals, wherein the predetermined condition includes that the channel correlation in the first direction among the plurality of terminals is higher than the channel correlation in the second direction among the plurality of terminals,
in response to the channel correlation in the first direction among the plurality of terminals not satisfying the predetermined condition,
transmit the first indication signal to indicate that the first measurement process is to be performed to determine the channel information in the first direction after the second measurement process is to be performed to determine the channel information in the second direction, and
transmit the second indication signal based on the channel information in the first direction.

5. The electronic device of claim 1, wherein the processing circuit is further configured to perform control to cause the electronic device to:
determine, based on respective channel information in the first direction fed back by the plurality of terminals, a common precoding parameter in the first direction for the plurality of terminals;
determine, based on respective channel information in the second direction fed back by the plurality of terminals, respective precoding parameters in the second direction for the plurality of terminals; and
determine, based on a Kronecker product of the common precoding parameter in the first direction and the precoding parameters in the second direction, a precoding parameter for the data to be transmitted to the plurality of terminals.

6. The electronic device of claim 5, wherein determining the common precoding parameter in the first direction for the plurality of terminals includes:
generating, based on the respective channel information in the first direction fed back by the plurality of terminals, the respective precoding parameters in the first direction for the plurality of terminals; and
taking a constant multiple of a weighted average of the respective precoding parameters in the first direction for the plurality of terminals as the common precoding parameter.

7. The electronic device of claim 1, wherein the processing circuit is further configured to perform control to cause the electronic device to:
determine, based on the channel information in the second direction, a demodulation parameter for non-linear demodulation at sides of the plurality of terminals; and
transmit the second indication signal including the demodulation parameter to the plurality of terminals, or transmit, from the base station to the plurality of terminals, a demodulation reference signal which is not non-linearly precoded for determining a demodulation parameter, wherein the demodulation reference signal includes K orthogonal sequences, where K is a number of the plurality of terminals.

8. The electronic device of claim 1, wherein the processing circuit is further configured to perform control to cause the electronic device to:
estimate, based on respective channel information in the second direction fed back by the plurality of terminals in the second measurement process, equivalent channel correlation in the second direction among the plurality of terminals; and transmit, in response to the estimated equivalent channel correlation in the second direction among the plurality of terminals being higher than a second correlation threshold, the second indication signal to indicate that the precoding scheme for the data to be transmitted from the base station to the plurality of terminals is non-linear precoding, and/or transmit, in response to the estimated equivalent channel correlation in the second direction among the plurality of terminals being lower than the second correlation threshold, the second indication signal to indicate that the precoding scheme for the data to be transmitted from the base station to the plurality of terminals is linear precoding.

9. An electronic device operating on a terminal side, comprising:

a processing circuit configured to perform control to cause the electronic device to:

transmit a first reference signal to a base station for the base station to estimate channel correlation in a first direction between a terminal and other terminals;

determine, in response to receiving a first indication signal, that a second measurement process is to be performed after a first measurement process is to be performed, wherein the electronic device performs a first measurement and feeds back first channel information in the first direction during the first measurement process, and the electronic device performs a second measurement and feeds back second channel information in a second direction during the second measurement process; and demodulate, in response to receiving a second indication signal, data transmitted from the base station according to a precoding scheme indicated in the second indication signal, the precoding scheme including linear precoding or non-linear precoding, wherein the first indication signal is transmitted by the base station in response to determining that the channel correlation in the first direction between the terminal and other terminals satisfies a predetermined condition, and the second indication signal is transmitted by the base station based on the second channel information in the second direction fed back by the terminal.

10. The electronic device of claim 9, wherein the processing circuit is further configured to perform control to cause the electronic device to:

receive, after receiving the first indication signal, a second reference signal transmitted by the base station in the first direction first to perform the first measurement; and select, a precoding matrix matching a result of the first measurement from a channel codebook in the first direction, and include an indicator of the precoding matrix in the first channel information in the first direction as fed back.

11. The electronic device of claim 9, wherein the processing circuit is further configured to perform control to cause the electronic device to:

transmit, during the first measurement process, the first channel information in the first direction to the base station, which is used to determine a common precoding parameter in the first direction for downlink data of the terminal and the other terminals; and transmit, during the second measurement process, the second channel information in the second direction to the base station, which is used to determine respective precoding parameters in the second direction for downlink data of the terminal and the other terminals;

wherein a Kronecker product of the common precoding parameter in the first direction and the precoding parameters in the second direction is used to determine a precoding parameter of the precoding scheme.

12. The electronic device of claim 11, wherein the processing circuit is further configured to perform control to cause the electronic device to, during the second measurement process:

receive, a third reference signal which is linearly preprocessed with the common precoding parameter from the base station; and determine, based on the third reference signal received from the base station which is linearly preprocessed with the common precoding parameter, the second channel information in the second direction.

13. The electronic device of claim 9, wherein the processing circuit is further configured to perform control to cause the electronic device to:

receive, a demodulation parameter for non-linear demodulation from the base station, wherein the demodulation parameter is determined by the base station based on the second channel information in the second direction, or receive, a demodulation reference signal which is not non-linearly precoded from the base station to determine a demodulation parameter for non-linear demodulation, wherein the demodulation reference signal includes K orthogonal sequences, where K is a number of the plurality of terminals.

14. The electronic device of claim 9, wherein the processing circuit is further configured to perform control to cause the electronic device to:

receive, a second reference signal transmitted from the base station at a first interval during the first measurement process; and receive, a third reference signal transmitted from the base station at a second interval during the second measurement process, wherein the second interval is shorter than the first interval.

15. The electronic device of claim 9, wherein the electronic device is implemented as a terminal, and the electronic device further includes antennas for receiving data signals precoded using the precoding scheme and transmitted by the base station to a plurality of terminals including the terminal on the same transmission resources, and the processing circuit is further configured to perform control to cause the electronic device to:

perform modulo operations on the received data signals for data demodulation, in response to the second indication signal indicating that the precoding scheme is non-linear precoding scheme.

16. An electronic device operating on a base station side, the electronic device comprising:

a processing circuit configured to perform control to cause the electronic device to:

estimate channel correlation in a first direction among a plurality of terminals communicating with the base station;

in response to the estimated channel correlation in the first direction among the plurality of terminals satisfying a predetermined condition, determine, based on the respective channel information in the first direction fed back by the plurality of terminals, a common precoding parameter in the first direction for the plurality of terminals;

determine, based on the respective channel information in a second direction fed back by the plurality of terminals, respective precoding parameters in the second direction for the plurality of terminals; and determine, based on a Kronecker product of the common precoding parameter in the first direction and the precoding parameters in the second direction, a precoding parameter for non-linear precoding of data to be transmitted from the base station to the plurality of terminals.

17. The electronic device of claim 16, wherein the channel correlation is estimated based on first reference signals received by the base station from the plurality of terminals.

18. The electronic device of claim 16, wherein determining the common precoding parameter in the first direction for the plurality of terminals includes:

generating, based on the respective channel information in the first direction fed back by the plurality of terminals, respective precoding parameters in the first direction for the plurality of terminals; and taking a constant multiple of a weighted average of the respective precoding parameters in the first direction for the plurality of terminals as the common precoding parameter.

19. The electronic device of claim 16, wherein the processing circuit is further configured to perform control to cause the electronic device to:

transmit a third reference signal which is linearly preprocessed with the common precoding parameter to the plurality of terminals, wherein the respective channel information in the second direction of the plurality of terminals is determined by the plurality of terminals based on the third reference signal received from the base station which is linearly preprocessed with the common precoding parameter.

20. The electronic device of claim 16, wherein the processing circuit is further configured to perform control to cause the electronic device to:

determine, based on the channel information in the second direction, a demodulation parameter for non-linear demodulation at sides of the plurality of terminals; and transmit a second indication signal including the demodulation parameter to the plurality of terminals.

* * * * *